United States Patent [19]
Machover et al.

[11] Patent Number: 5,650,583
[45] Date of Patent: Jul. 22, 1997

[54] AUTOMATIC PERFORMANCE DEVICE CAPABLE OF MAKING AND CHANGING ACCOMPANIMENT PATTERN WITH EASE

[75] Inventors: Tod Machover, Belmont; Joseph Chung, Cambridge; Fumiaki Matsumoto; Alex Rigopulos, both of Somerville, all of Mass.

[73] Assignee: Yamaha Corporation, Japan

[21] Appl. No.: 668,507

[22] Filed: Jul. 2, 1996

Related U.S. Application Data

[63] Continuation of Ser. No. 162,852, Dec. 6, 1993, abandoned.

[51] Int. Cl.⁶ .......................... G09B 15/04; G10H 1/053; G10H 1/36
[52] U.S. Cl. .................. 84/626; 84/634; 84/658; 84/669; 84/478
[58] Field of Search ................ 84/626, 609–613, 84/634–638, 649–652, 658, 666–669, 477 R, 478, DIG. 12, DIG. 22

[56] References Cited

U.S. PATENT DOCUMENTS

| | | | |
|---|---|---|---|
| 4,378,720 | 4/1983 | Nakada et al. | 84/478 X |
| 4,630,517 | 12/1986 | Hall et al. | 84/DIG. 22 |
| 4,685,370 | 8/1987 | Okuda et al. | |
| 4,708,046 | 11/1987 | Kozuki | 84/DIG. 12 |
| 4,930,390 | 6/1990 | Kellogg et al. | 84/DIG. 12 |
| 5,085,118 | 2/1992 | Sekizuka | 84/635 |
| 5,262,583 | 11/1993 | Shimada | 84/609 |
| 5,278,348 | 1/1994 | Eitaki et al. | 84/636 |
| 5,350,880 | 9/1994 | Sato | 84/609 |

*Primary Examiner*—Stanley J. Witkowski
*Attorney, Agent, or Firm*—Graham & James LLP

[57] ABSTRACT

A pattern memory stores plural accompaniment patterns for each of plural accompaniment components. Each of the accompaniment components is composed of one or more musical instrument parts for an accompaniment performance. There are provided operating members which are used for selectively designating a desired component and a touch sensor for detecting an operation touch applied to the operated operating member. Any of the plural accompaniment patterns corresponding to the designated component is selected in accordance with the detected operation touch, and the selected accompaniment pattern is read out from the memory. The entire accompaniment performance pattern is provided by a combination of the accompaniment patterns thus selected for the respective components. In order to allow the selected pattern to be changed freely, modifiers representing how to make the change may be utilized by the user. In such a case, the accompaniment pattern is changed in accordance with a predetermined algorithm that corresponds to the modifier selected by the user.

32 Claims, 15 Drawing Sheets

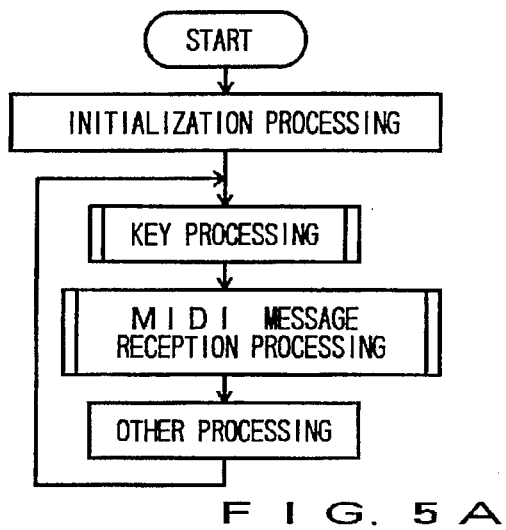
F I G. 5A
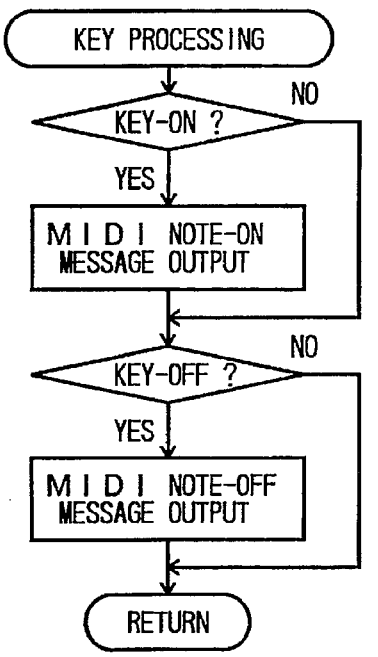
F I G. 5B
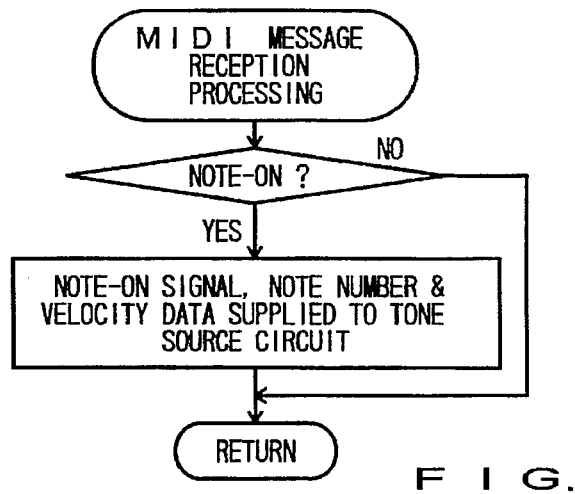
F I G. 5C
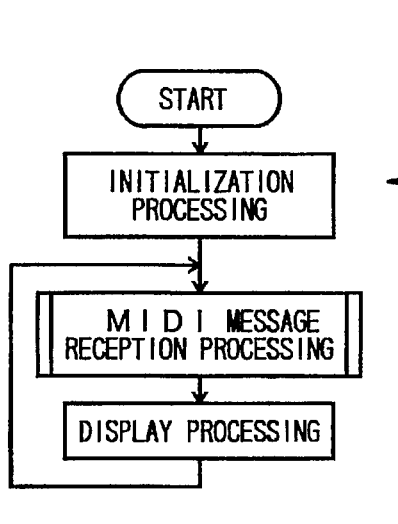
F I G. 6A
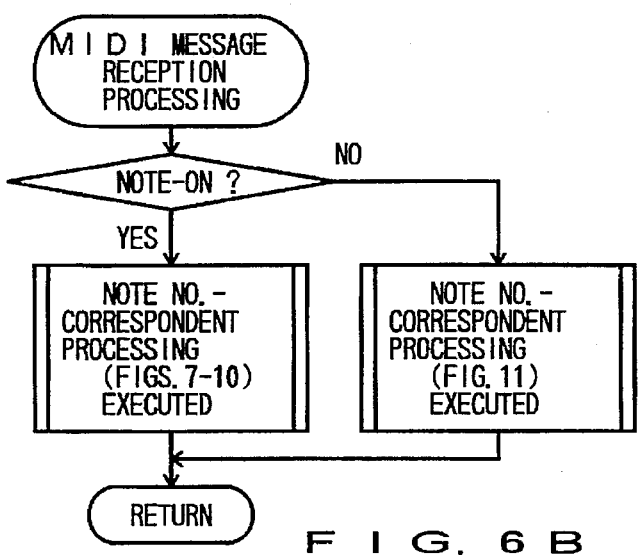
F I G. 6B

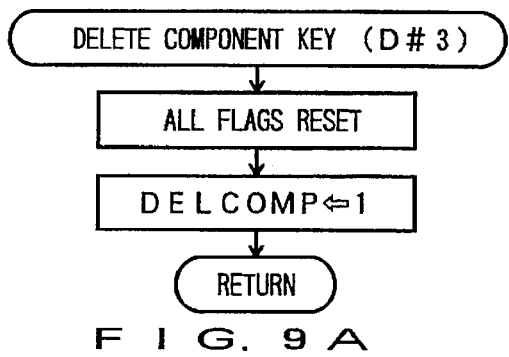
FIG. 9A
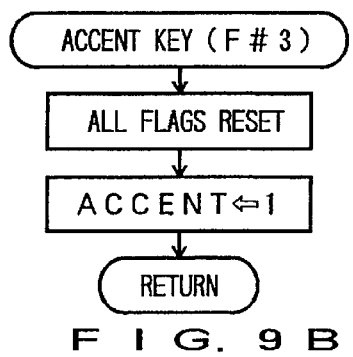
FIG. 9B
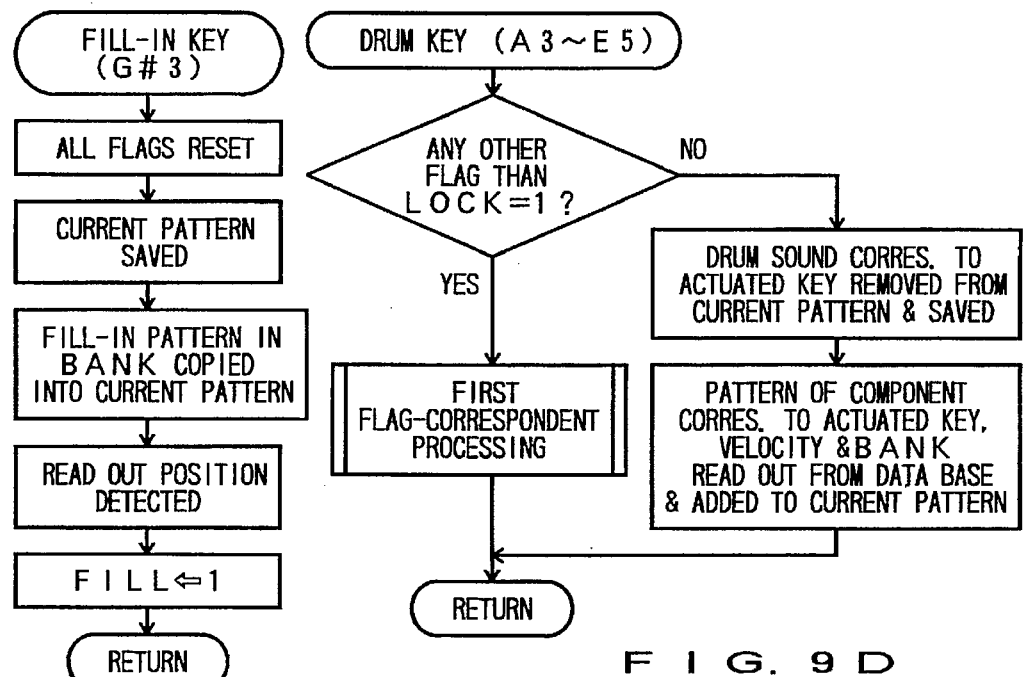
FIG. 9C
FIG. 9D
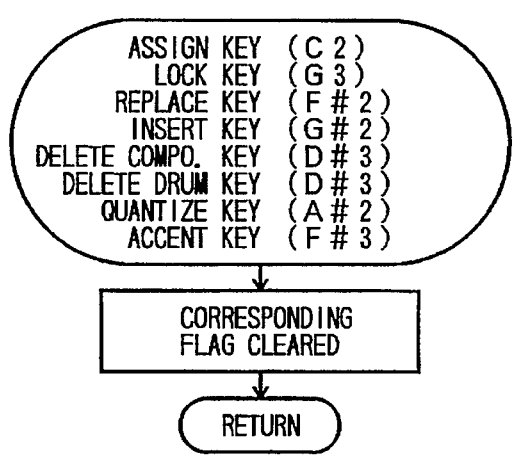
FIG. 11A
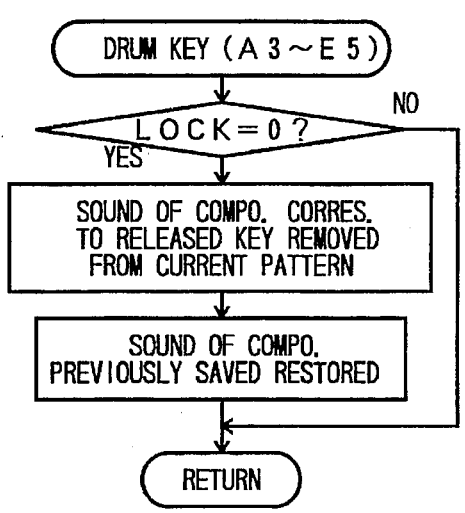
FIG. 11B

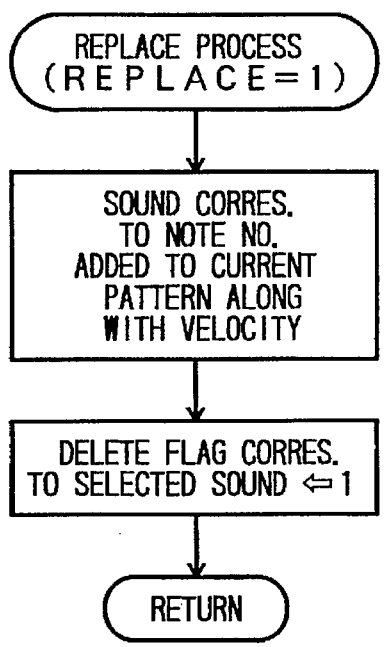
F I G. 1 0 A
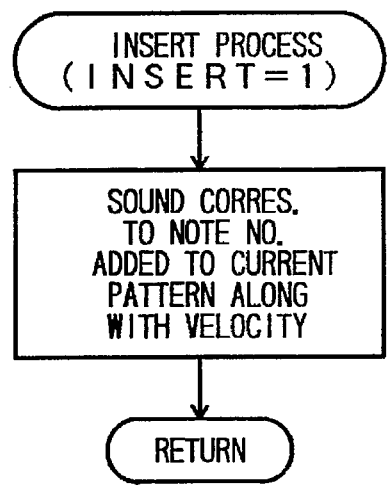
F I G. 1 0 B
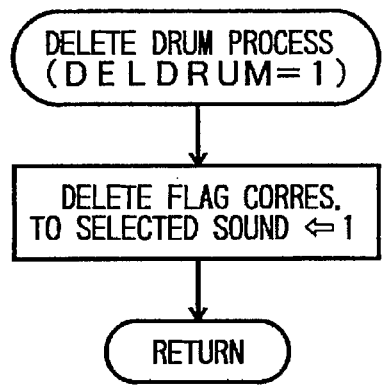
F I G. 1 0 C
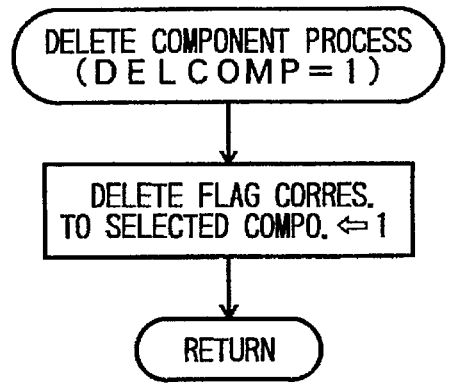
F I G. 1 0 D

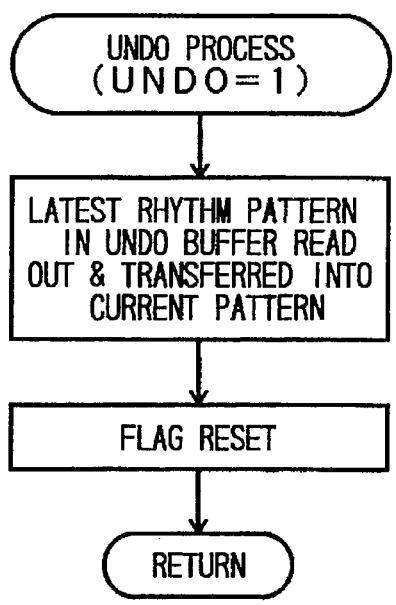
F I G. 1 4 A
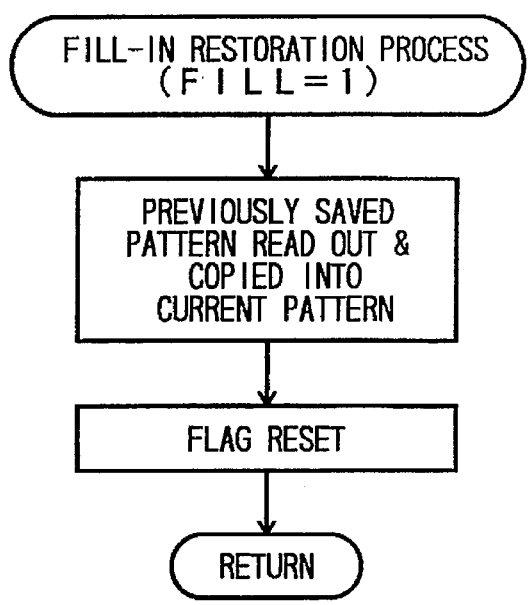
F I G. 1 4 B
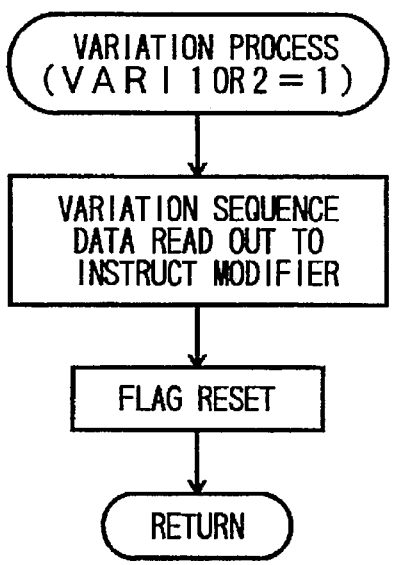
F I G. 1 4 C
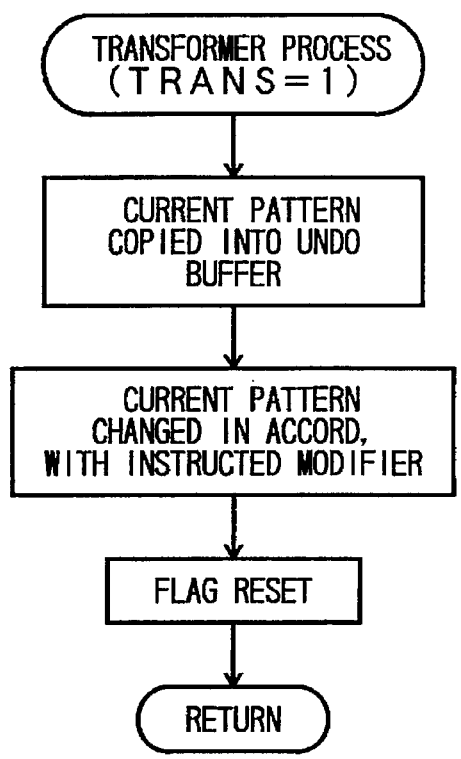
F I G. 1 4 D

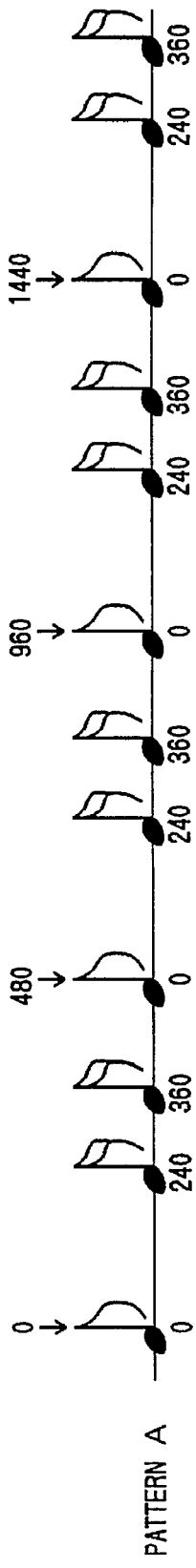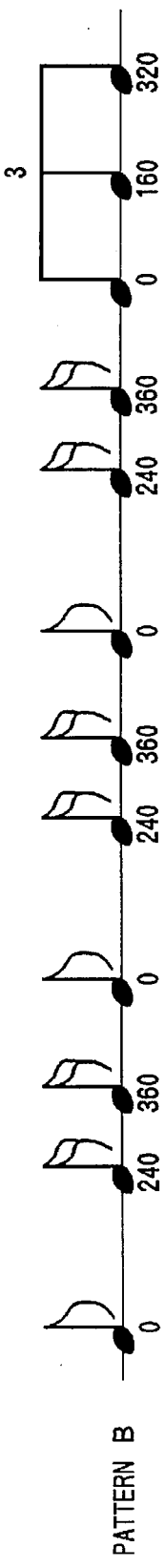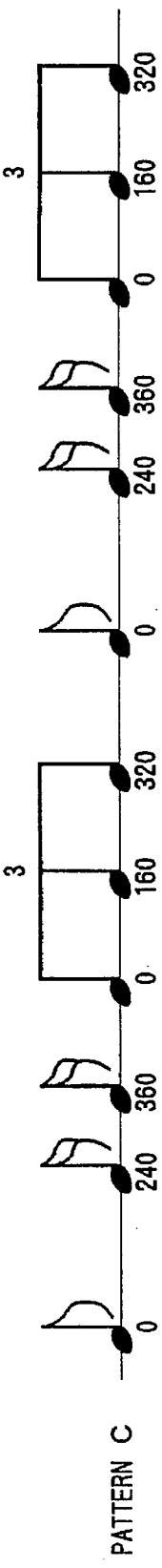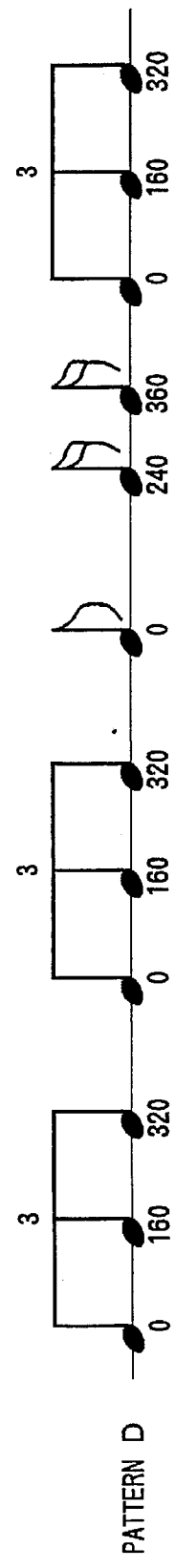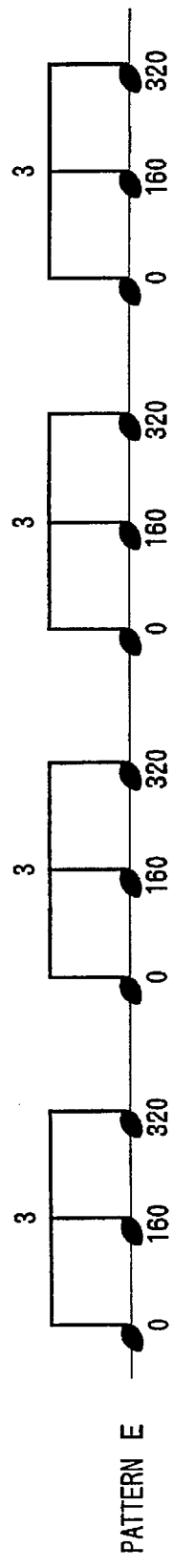
FIG. 15

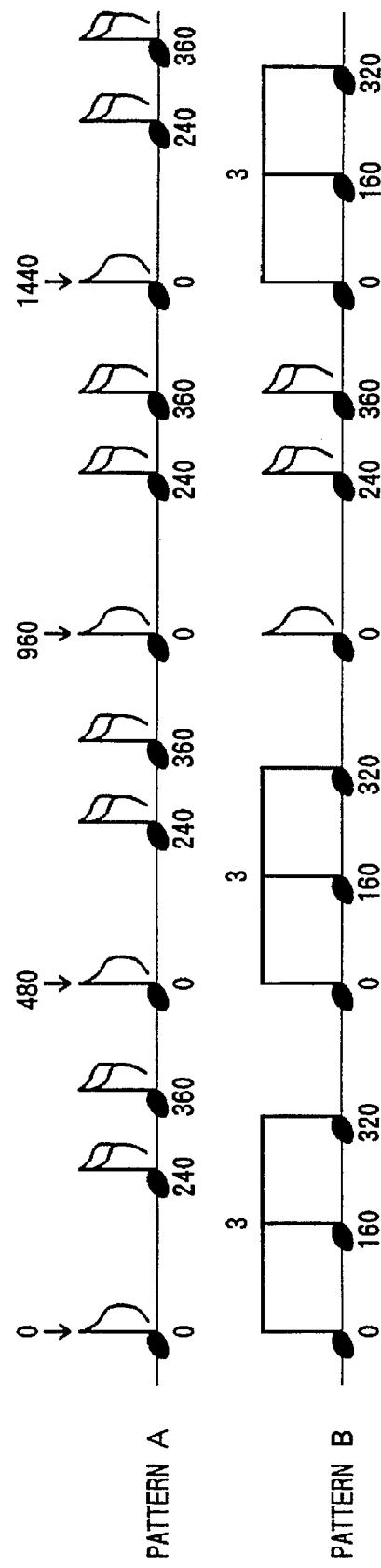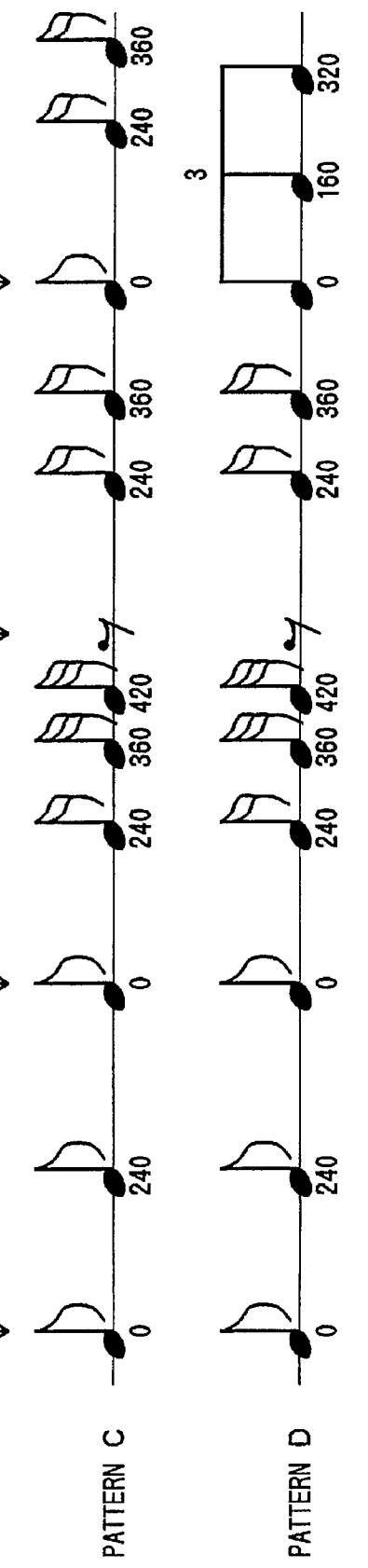
FIG. 16

AUTOMATIC PERFORMANCE DEVICE CAPABLE OF MAKING AND CHANGING ACCOMPANIMENT PATTERN WITH EASE

This is a continuation of application Ser. No. 08/162,852 filed on Dec. 6, 1993 and now abandoned.

BACKGROUND OF THE INVENTION

The present invention generally relates to an automatic accompaniment device which is applicable to automatic rhythm performance and other forms of automatic accompaniment, and more particularly to such a device which is capable of making and changing accompaniment patterns with utmost ease.

For providing automatic accompaniment patterns desired by the users, the prior art automatic accompaniment devices typically depend on an approach of selecting any of plural accompaniment patterns that are stored in memory in advance. However, this approach has the disadvantage that only a limited number of accompaniment patterns can be selected. Namely, in this type of prior art automatic accompaniment devices, the number of accompaniment patterns that can be stored in memory is so limited that it is only allowed to merely select as close patterns as possible to what the users actually desire. Thus, more often than not, accompaniment patterns can not be provided which are truly satisfactory to the users.

So, as an approach for freely making automatic accompaniment patterns in accordance with the users' desire, it has been proposed that desired accompaniment patterns are sampled or made and stored into memory by the user manually playing a keyboard of electronic musical instrument etc. in an arbitrary manner. In this way, automatic accompaniment can be performed by reading out the accompaniment patterns stored in the memory. Nevertheless, this approach also has the problem that it is difficult, if not impossible, to make proper accompaniment patterns unless the user has enough musical knowledge and performance skill. Besides, even if the user has enough knowledge and performance skill, it often takes a considerable amount of time and labor to make accompaniment patterns, and this renders it very difficult to make accompaniment patterns as desired by the user.

U.S. Pat. No. 4,685,370 discloses a solution for facilitating the rhythm performance pattern making. According to the disclosure, plural patterns are stored in advance for each percussive tone source in such a manner that desired pattern is selected for each of the tone source, so that a desired rhythm performance pattern as a whole can be provided by a combination of the selected patterns for the respective percussive tone sources. But, with the disclosed technique, it is necessary to make separate selections of the percussive tone source and pattern, which is very troublesome and time-consuming. The disclosed technique also has the problem of poor operability and is not satisfactory in that variation of performance patterns provided by the combination of the stored patterns is quite limited. Further, since selection can be made only from the stored patterns, it is not possible to make accompaniment patterns freely at the user's will.

SUMMARY OF THE INVENTION

Therefore, it is an object of the present invention to provide an automatic accompaniment device which is capable of making and changing accompaniment patterns with utmost ease no matter how complex the accompaniment patterns may be.

To achieve the above-mentioned object, an automatic accompaniment device according to the present invention comprises an accompaniment pattern storage section for storing plural accompaniment patterns for each of plural accompaniment components, each of the components being composed of one or more musical instrument parts for an accompaniment performance, plural operating members for designating any of the components, a touch detection section for, when any of the operating members is operated, detecting an operation touch applied to the operating member, a readout section for reading out from the accompaniment pattern storage section any of the plural accompaniment patterns corresponding to the component designated by the operating member, on the basis of a combination of information identifying the operated operation member and information indicative of the operation touch detected by the touch detection section, and an accompaniment tone generation section for generating an automatic accompaniment tone on the basis of the accompaniment pattern read out by the readout section.

In the above-mentioned automatic accompaniment device, each accompaniment component is composed of one or more musical instrument parts; for instance, plural interrelated musical instrument parts (e.g., snare drum and bus drum, ride cymbals and high-hat cymbals, etc.) may be classified as such an accompaniment component. The user can designate a desired accompaniment component by operating the operating member, and can also select any of the accompaniment patterns for the designated accompaniment component by an operation touch applied to the operating member. The selected accompaniment pattern is read out from the accompaniment pattern storage section. The entire accompaniment pattern is provided by a combination of the patterns selected for the respective accompaniment components.

The accompaniment pattern selected for one component is the collective accompaniment pattern for one or more musical instrument parts forming the component. Therefore, only by designating a desired component, the user can select automatic pattern from among a number of automatic patterns stored in the optimum conditions. This advantageously permits the optimum accompaniment pattern selection even if the user has not enough musical knowledge. In addition, since the pattern selection for one component is made in accordance with the detected operation touch on the operation member, the pattern selection can be made very simple and easy. The ease in the pattern selection can make it easy to select from among multiple accompaniment patterns stored for each component. As the result, accompaniment patterns can be made and changed in a more flexible manner and can be enriched in musical expression.

The operating members for designating the accompaniment components may be dedicated switches for designating individual accompaniment components, or may be such operating members for individual musical instrument parts. In the latter case, it is determined to which component the musical instrument part corresponding to the operated operating member belongs, and then the component designation finally becomes effective on the basis of the determination.

The automatic accompaniment device according to the present invention may further comprise a modification section for modifying the accompaniment pattern read out by the readout section.

The automatic accompaniment device according to the present invention may further comprise a display section visibly showing a pattern of the automatic accompaniment tone being generated by the accompaniment tone generation section.

Further, an automatic accompaniment device according to another aspect of the present invention comprises an accompaniment pattern storage section for storing plural accompaniment patterns for each of plural accompaniment components, each of the components being composed of one or more musical instrument parts for an accompaniment performance, a selection section including operating members for designating any of the components as desired, the selection section selecting any of the plural accompaniment patterns corresponding to the component designated by the operating member, a readout section for reading out from the accompaniment pattern storage section the accompaniment pattern selected by the selection section, and a first control section for allowing an automatic accompaniment tone to be generated on the basis of the accompaniment pattern read out from the accompaniment pattern storage section, only while a component designating operation by the operating section continues. This automatic accompaniment device may further comprise a reservation section for, when a first accompaniment pattern is selected in response to the component designating operation by the operating section, reserving information on a second accompaniment pattern previously selected for the designated component, and a second control section for, after termination of the component designating operation by the operating section, restoring generation of an automatic accompaniment tone on the basis of said information on the second accompaniment pattern stored in the reservation section. This automatic accompaniment device may further comprise a mode selection section for selecting a lock mode for, even after termination of the component designating operation by the operating section, continually allowing an automatic accompaniment tone to be generated on the basis of the first accompaniment pattern selected for the designated component, and in which the second control section does not restore the second accompaniment pattern if the lock mode is selected by the mode selection section. These arrangements are advantageous in that they facilitate the operation to select desired accompaniment patter.

An automatic accompaniment device according to still another aspect of the present invention comprises an accompaniment pattern storage section for storing an accompaniment pattern, a readout section for reading out the accompaniment pattern from the accompaniment pattern storage section, a modifier supply section for selectively supplying modifier data representing how to change the accompaniment pattern, and a change section for changing the accompaniment pattern read out by the readout section, in accordance with a predetermined algorithm that corresponds to the modifier data supplied by the modifier supply section. This arrangement is advantageous in that it makes it possible to make new accompaniment pattern not stored in memory with extremely simple operations. The user need not be familiar with exact procedures and operations required for making and editing accompaniment patterns, and the user only has to select desired modifier. In correspondence to the selected modifier, a predetermined pattern change process is executed in such a manner that various elements forming the pattern are automatically changed in various fashions.

Now, the preferred embodiments of the present invention will be described in greater detail with reference to the accompanying drawings.

BRIEF DESCRIPTION OF THE DRAWINGS

In the drawings:

FIG. 5A is a flowchart of a main routine carried out by a CPU of the electronic musical instrument shown in FIG. 2;

FIG. 5B is a flowchart of key processing shown in FIG. 5A;

FIG. 5C is a flowchart of MIDI message reception processing shown in FIG. 5A;

FIG. 6A is a flowchart illustrating an example of a main routine carried out by a CPU of the personal computer shown in FIG. 2;

FIG. 6B is a flowchart illustrating the detail of the MIDI message reception processing shown in FIG. 6A;

FIG. 9A is a flowchart illustrating the detail of the processing of FIG. 6B which is carried out in such a case where a received MIDI message is a note-on message corresponding to a delete component key of note number D#3;

FIG. 9B is a flowchart illustrating the detail of the processing of FIG. 6B which is carried out in such a case where a received MIDI message is a note-on message corresponding to an accent key of note number F#3;

FIG. 9C is a flowchart illustrating the detail of the processing of FIG. 6B which is carried out in such a case where a received MIDI message is a note-on message corresponding to a fill-in key of note number G#3;

FIG. 9D is a flowchart illustrating the detail of the processing of FIG. 6B which is carried out in such a case where a received MIDI message is a note-on message corresponding to any of drum keys of note numbers A3-E5;

FIG. 10A is a flowchart of a replace process which is included in first flag-correspondent processing shown in FIG. 9D;

FIG. 10B is a flowchart of an insert process which is included in the first flag-correspondent processing of FIG. 9D;

FIG. 10C is a flowchart of a delete drum process which is included in the first flag-correspondent processing of FIG. 9D;

FIG. 10D is a flowchart of a delete component process which is included in the first flag-correspondent processing of FIG. 9D;

FIG. 11A is a flowchart illustrating in detail the processing of FIG. 6B which is carried out in such a case where a received MIDI message is a note-off message corresponding to any of note numbers C2, G3, F#2, G#2, A#2, C#3, D#3, F#3;

FIG. 11B is a flowchart illustrating in detail the processing of FIG. 6B which is carried out in such a case where a received MIDI message is a note-off message corresponding to any of note numbers A3-E5;

FIG. 14A is a flowchart of an undo process which is included in second flag-correspondent processing shown in FIG. 12;

FIG. 14B is a flowchart of a fill-in restoration process which is included in the second flag-correspondent processing shown in FIG. 12;

FIG. 14C is a flowchart of a variation process which is included in the second flag-correspondent processing shown in FIG. 12;

FIG. 14D is a flowchart of a transformer process which is included in the second flag-correspondent processing shown in FIG. 12;

FIG. 15 is a diagram explaining an example of operations for changing the contents of a current pattern in the transformer process;

FIG. 16 is a diagram explaining another example of the operations for changing the contents of a current pattern in the transformer process;

DETAILED DESCRIPTION OF THE PREFERRED EMBODIMENTS

Figure 2:
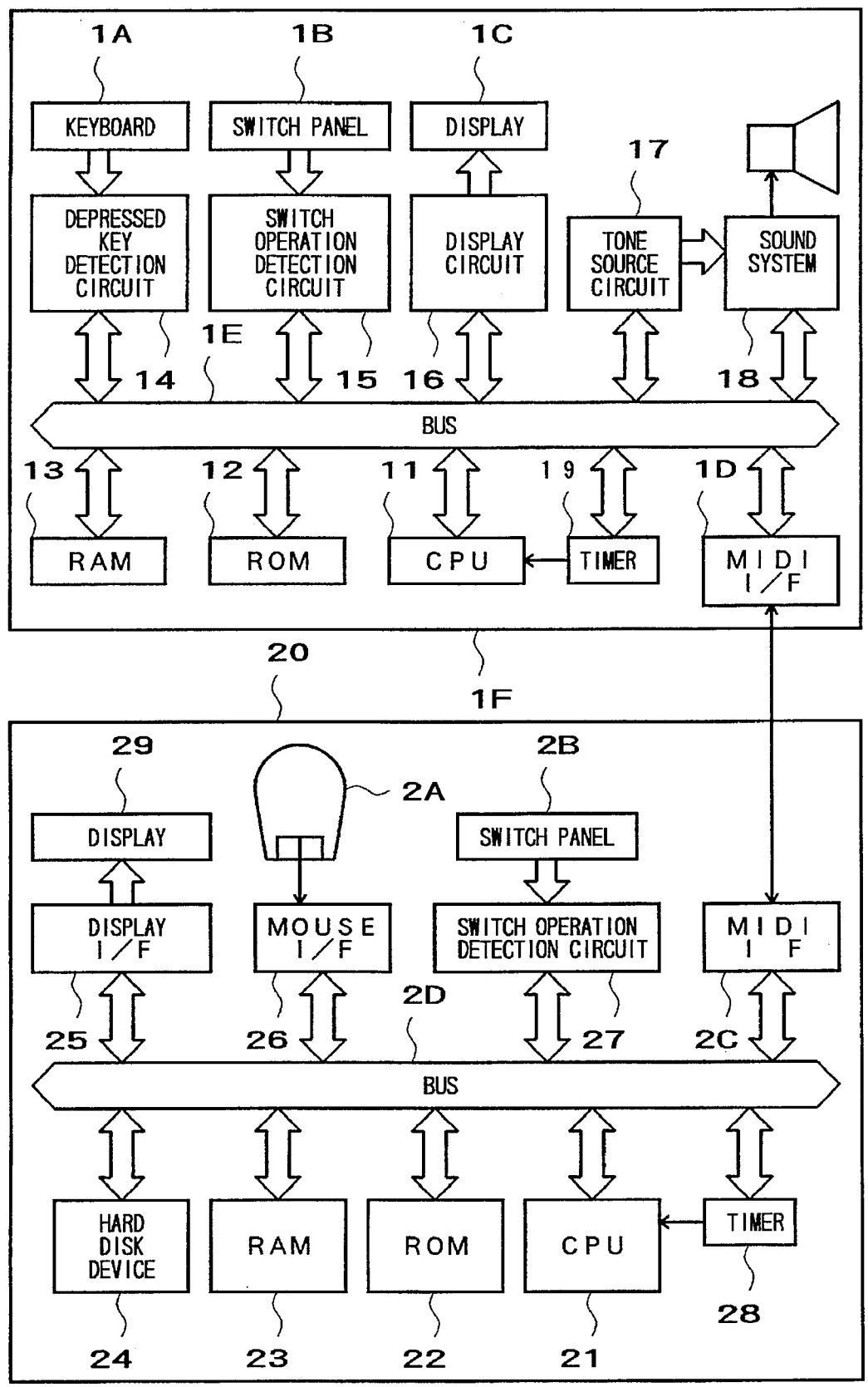
FIG. 2 is hardware block diagram illustrating in detail the structure of and the connection between the electronic musical instrument incorporating therein a sequencer-type automatic accompaniment device and the personal computer used for editing accompaniment patterns.

FIG. 2 is a hardware block diagram illustrating the particular structure of and the connection between an electronic musical instrument 1F including a sequencer-type automatic accompaniment device, and a personal computer 20 used for editing accompaniment patterns.

First, the particular structure of the electronic musical instrument 1F will be described in detail.

A microprocessor unit (CPU) 11 controls the entire operation of the electronic musical instrument 1F. To this CPU 11 are connected, via a bus 1E, a ROM 12, a RAM 13, a depressed key detection circuit 14, a switch operation detection circuit 15, a display circuit 16, a tone source circuit 17, a sound system 18, a timer 19 and a MIDI interface (I/F) 1D.

Here, description will be made on, for example, such a specific electronic musical instrument in which key depression processing and automatic performance processing are carried out through the CPU 11. But, it should be noted that the principle of the present invention is also applicable to another type of electronic musical instrument in which there are separately provided a sequencer module for carrying out the automatic performance processing, and a module comprising the depressed key detection circuit 14 and the tone source circuit 17, and in which data are exchanged between the modules via MIDI interfaces.

The ROM 12, which is a read-only memory, stores therein various programs and data that are utilized by the CPU 11.

The RAM 13 is provided in predetermined address areas of a random access memory for use as registers and flags for temporarily storing various performance data and various other data which are produced as the CPU 11 executes the programs.

A keyboard 1A, which has a plurality of keys for designating the pitch of tones to be generated, comprises key switches corresponding to the keys. If necessary, the keyboard 1A may also include key-touch detection means such as a key depression intensity detection device. The keyboard 1A is employed here just because it is a fundamental performance operator which is easy for music players to manipulate, but any other suitable performance operator such as drum pads or the like may of course be employed.

The depressed key detection circuit 14, which comprises a key switch circuit corresponding to the keys on the keyboard 1a, outputs key-on event data whenever a key has been newly depressed or actuated and key-off event data whenever a key has been newly released from the depressed state. The depressed key detection circuit 14 also generates key touch data by determining the velocity or intensity of key depression. Each of the key-on and key-off data and key touch data is expressed in accordance with the MIDI standard and contains data indicative of a key code and a tone generation channel.

A switch panel 1B comprises a variety of operating members for selecting, setting and controlling the tone color, volume, effect etc. of tones to be generated. The switch panel 1B is of any conventionally-known structure and will not be described further.

The switch operation detection circuit 15 detects the operational state of each operating member on the switch panel 1B and supplies the CPU 11 with switch data corresponding to the detected operational state, via the bus 1E.

By means of a display section 1C, the display circuit 16 shows various data such as the controlling state of the CPU 11 and the contents of currently set data. The display section 1C comprises, for example, a liquid crystal display (LCD), and its operation is controlled by the display circuit 16.

The tone source circuit 17 has a plurality of tone generation channels, by means of which it is capable of generating plural tones simultaneously. The tone source circuit 17 receives performance data (data based on the MIDI standard) supplied via the bus 1E, and on the basis of the received data, it can generate tone signals through selectively assigned tone generation channels.

Any tone signal generation system may be used for the tone source circuit 17. For example, any conventionally known tone signal generation system may be used such as: the memory readout system where tone waveform sample value data stored in a waveform memory are sequentially read out in accordance with address data that change in correspondence to the pitch of tone to be generated; the FM system where tone waveform sample value data are obtained by performing predetermined frequency modulation operations using the above-mentioned address data as phase angle parameter data; or the AM system where tone waveform sample value data are obtained by performing predetermined amplitude modulation operations using the above-mentioned address data as phase angle parameter.

The tone signal generated by the tone source circuit 17 is audibly reproduced through the sound system 18 which comprises an amplifier and a speaker (both not shown).

The timer 19 generates tempo clock pulses which are used for counting time intervals and for setting automatic performance tempo. The frequency of the tempo clock pulses can be set and adjusted by the use of a tempo switch on the switch panel 1B. The tempo clock pulses are applied to the CPU 11 as interrupt commands, in response to which the CPU 11 carries out the automatic performance processing on the timer interrupt basis.

A MIDI interface (I/F) 1D interconnects the bus 1E of the electronic musical instrument 1F and a MIDI interface (I/F) 2C. The MIDI interface 2C in turn interconnects a bus 2D of the personal computer 20 and the above-mentioned MIDI interface 2C. Accordingly, the bus 1E of the musical instrument 19 and the bus 2D of the personal computer 20 are interconnected via the two MIDI interfaces 1D and 2C, so that data exchange based on the MIDI standard can be done bidirectionally.

Next, the structure of the personal computer 20 will be described in detail.

A microprocessor unit (CPU) 21 controls the entire operation of the personal computer 20. To this CPU 21 are connected, via the bus 2D, a ROM 22, a RAM 23, a hard disk device 24, a display interface (I/F) 25, a mouth interface (MOUSE I/F) 26, a switch operation detection circuit 27, a timer 28 and the above-mentioned MIDI interface 2C.

Figure 3:
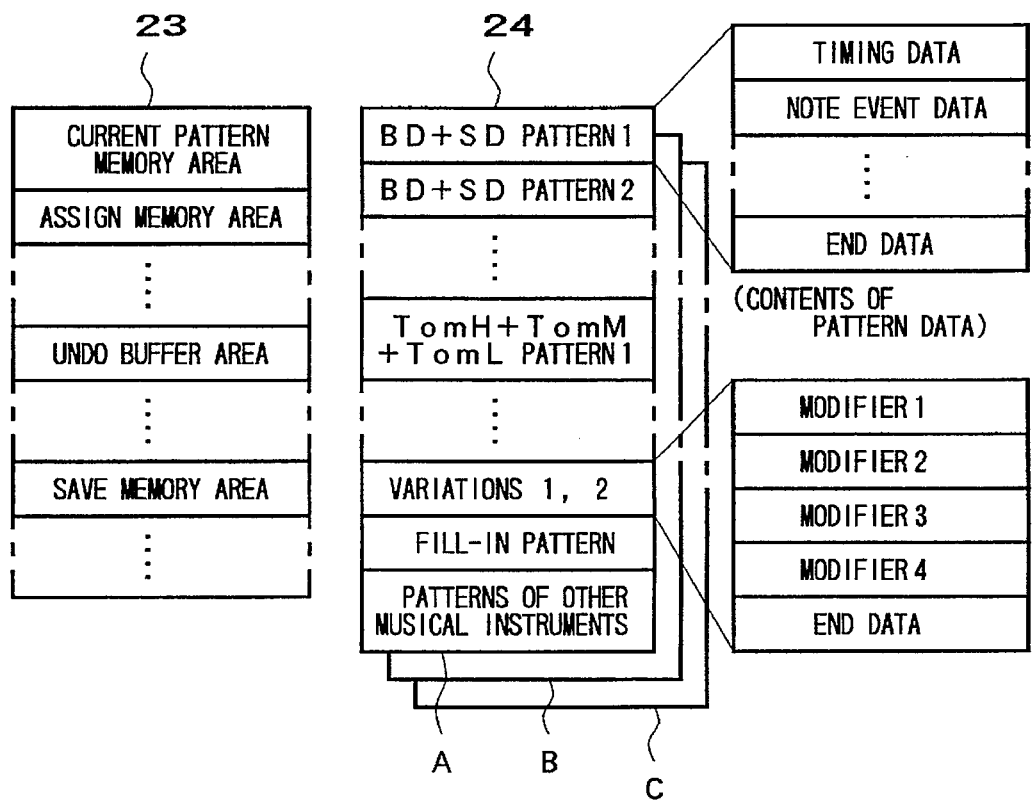
FIG. 3 illustrates the data formats in a RAM and a hard disk device of the personal computer shown in FIG. 2.

The ROM 22, which is a read-only memory, stores therein a variety of data such as various programs and data and various signs and characters. The RAM 23, which is an random access memory (RAM), temporarily stores various data produced as the CPU 21 executes the programs. As shown in FIG. 3, predetermined areas of the RAM 23 in this embodiment are assigned as a current pattern memory area, an assign memory area, an undo buffer area and a save memory area.

The current pattern memory area is used for storing each rhythm pattern which is read out during an automatic accompaniment (current pattern). The assign memory area is used for storing each rhythm pattern which is newly made by edit processing or transformer process as will be described later in detail. The undo buffer area is used for temporarily storing each rhythm pattern which is changed or transformed by the transformer process. The save memory area is used for saving the current pattern when a fill-in is inserted, or for temporarily storing a preceding rhythm pattern component when some rhythm pattern component is newly read out from a predetermined data base provided by the hard disk device 24. Here, the term "component" will be used to mean an accompaniment component.

The hard disk device 24, which is an external storage device of the personal computer 20, has a storage capacity somewhere between dozens of megabytes (MB) and hundreds of megabytes. In this embodiment, the hard disk device 24 which is used as the data base of rhythm patterns is divided into three banks A, B, C for storing three different categories of patterns. In each of the banks A, B, C, there are stored a plurality of rhythm patterns for each component. The stored rhythm patterns of each component progressively vary from simple pattern to complex pattern. For instance, for the component of bus drum (BD) and snare drum (SD), plural patterns comprising BD+SD pattern 1, BD+SD pattern 2, . . . are stored which become progressively complex as the pattern number increases. Each of the banks A, B, C also stores fill-in patterns in preparation for real time performance and patterns of other musical instruments, and thus, if desired, performance can be made by temporarily inserting the fill-in pattern in place of the current pattern.

Each of the rhythm patterns in the banks A, B, C comprises a set of performance data stored on a relative time basis, and each of the performance data is a combination of timing data indicative of the timing of an event and note event data indicative of the sort of the event. In this embodiment, the note event data is a three-byte data stored in a format corresponding to a MIDI note-on message. The timing data is represented by the number of clock pulses between adjacent note events. In the hard disk device 24, there are also stored, as variations 1 and 2, two kinds of sequence data for selectively instructing modifiers for rhythm pattern transformation. As shown in FIG. 3, variations 1 and 2 comprise sequential data including modifiers 1-4 stored in sequence.

Although not shown in the drawings, a cache memory (RAM) having a capacity of, for example, several megabytes may be provided to effectively reduce the time required for accessing the hard disk device 24, or a DMA (Direct Memory Access) device may be provided to reduce the burden involved in data exchange between the RAM 23 and the hard disk device 24.

A display 29, which comprises a conventional CRT or LCD, inputs thereto data processed within the personal computer 20 via a display interface (I/F) and shows the input data in video form on its screen.

A mouse 2A is a kind of pointing device for inputting desired coordinate points to the personal computer 20, and the output of the mouse 2A is supplied to the CPU 21 via a mouse interface (MOUSE I/F) and the bus 2D.

A switch panel 2B is a keyboard for inputting programs and data to the personal computer 20 and includes ten-keys and function keys.

A switch operation detection circuit 27 detects the operational state of each key on the switch panel 2B and provides, via the bus 2D, the CPU 21 with key operation data corresponding to the detected operational state.

A timer 28 generates operation clock pulses for the entire CPU 20. By counting the clock pulses, the personal computer 20 can count a predetermined time, in response to which it carries out timer interrupt processing.

According to this embodiment, in addition to the mouse 2A and switch panel 2B of the personal computer 20, the keys on the keyboard 1A of the electronic musical instrument 1F can work as an operating member for selecting, setting and controlling the functions of the personal computer 20. This is achieved by transmitting a note number corresponding to the key depression state on the keyboard 1A over to the CPU 21 of the personal computer 20 via the MIDI interfaces 1D and 2C.

Figure 4:
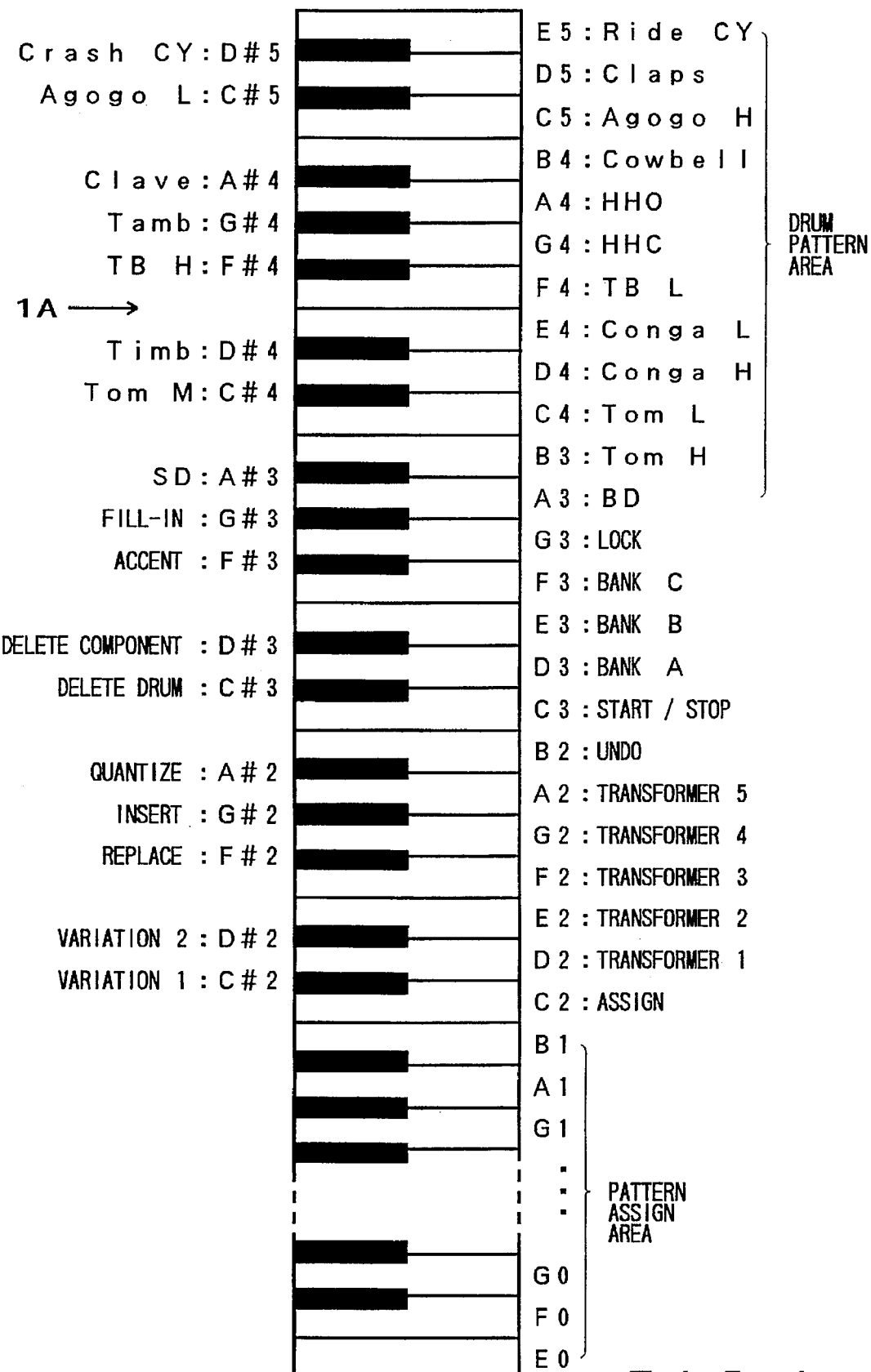
FIG. 4 illustrates an example of various functions assigned to keyboard keys shown in FIG. 2.

FIG. 4 illustrates an example of various functions assigned to the keys on the keyboard 1A.

In the illustrated example, the keyboard 1A, which has 61 keys in total, is divided into a pattern assign area, an operating member area and a drum pattern area. The keys of note numbers E0-B1 form the pattern assign area, the keys of note numbers C2-G#3 form the operating member area, and the keys of note numbers A3-E5 form the drum pattern area.

The keys of note numbers E0-B1 generate addresses which correspond to an assign memory area for storing each rhythm pattern that has been made by the edit and transformer process as a new rhythm pattern. Namely, the assign memory area in the RAM 23 is composed of an assign memory administration subarea having 20 addresses and pattern storage subareas capable of storing 20 patterns, and the addresses of the assign memory administration subarea correspond to note numbers E0-B1. For instance, note number E0 corresponds to the first address in the assign memory administration subarea, and similarly note numbers F#0-B1 correspond to the third to twentieth address in the area. In each of the address in the assign memory administration subarea, there is stored the value of head address of the corresponding pattern storage subarea.

The keys of note numbers C2-G#3 function as various kinds of operating members for executing the edit and transformer process. Therefore, note numbers C2-G#3 by themselves constitute key operation data indicating the operating member functions assigned to these keys.

More specifically, the key of note number C2 corresponds to an assign key; the keys of note numbers D2, E2, F2, G2 and A2 correspond to transformer keys for designating transformers 1-5; the key of note number B2 to an undo designation key; and the key of note number C3 to a start/stop key. Further, the keys of note numbers D3, E3 and F3 correspond to bank keys for designating banks A-C; the key of note number G3 to a pattern-establishing lock key; the keys of note numbers C#2 and D#2 to variation keys for designating variations 1 and 2; the key of note number F#2 to a replace input key; the key of note number G#2 to an insert input key; and the key of note number A#2 to a quantize processing designation key. Furthermore, the key of note number C#3 corresponds to a delete drum instruction key; the key of note number D#3 to a delete component instruction key; the key of note number F#3 to an accent input key; and the key of note number G#3 to a fill-in designation key.

The keys of note numbers A3-E5 in the drum pattern area of the keyboard 1A function as drum sound designation keys. Therefore, the note numbers A3-E5 by themselves constitute drum sound data indicative of the kind of drum sounds assigned to these keys.

More specifically, the key of note number A3 corresponds to a sound of bus drum (BD); the key of note number A#3 to a sound of snare drum (SD); the key of note number B3 to a sound of tom-tom high (Tom H); the key of note number C4 to a sound of tom-tom low (Tom L); the key of note number C#4 to a sound of tom-tom middle (Tom M); the key of note number D4 to a sound of conga high (Conga H); and the key of note number E4 to a sound of conga low (Conga L). Further, the key of note number D#4 corresponds to a sound of timbales (Timb); the key of note number F4 to a sound of temple block (i.e., wooden drum in a temple) low (TB L); the key of note number F#4 to a sound of temple block high (TB H); the key of note number G4 to a sound of closed high-hat cymbals (HHC); the key of note number A4 to a sound of open high-hat cymbals (HHO); the key of note number G#4 to a sound of tambourine (Tamb); the key of note number A#4 to a sound of claves (Clave); and the key of note number B4 to a sound of cowbell (Cowbell). Furthermore, the key of note number C5 to a sound of agogo high (Agogo H); the key of note number C#5 to a sound of agogo low (Agogo L); the key of note number D5 to a sound of hand claps (Claps); the key of note number D#5 to a sound of crash cymbals (Crash CY); and the key of note number E5 to a sound of ride cymbals (Ride CY). Each of the drum sounds can be designated independently of the others, but, in this embodiment, it is used as a component of plural sounds combined to realize a desired form of performance. Accordingly, some components may comprise only one of the drum sounds and other components may comprise a plurality of the drum sounds. In the case of a component comprising a plurality of the drum sounds, it is necessary that a certain common characteristic (musical relevancy) be present between the drum sounds. For instance, such a component is formed by each of the following combinations: bus drum (BD) and snare drum (SD); tom-tom high (Tom H), tom-tom middle (Tom M) and tom-tom low (Tom L); conga high (Conga H), conga low (Conga L) and timbales (Timb); temple block high (TB H) and temple block low (TB L); open high-hat cymbals (HHO) and closed high-hat cymbals (HHC); and agogo high (Agogo H) and agogo low (Agogo L). Therefore, in this case, each of the drum sounds of tambourine (Tamb), claves (Clave), cowbell (cowbell), hand claps (Claps), crash cymbals (Crash CY) and ride cymbals (Ride CY) forms a component by itself.

Alternatively, any other components may of course be formed by respective combinations of tambourine (Tamb) and claves (Clave); crash cymbals (Crash CY) and ride cymbals (Ride CY) etc.

Figure 1:
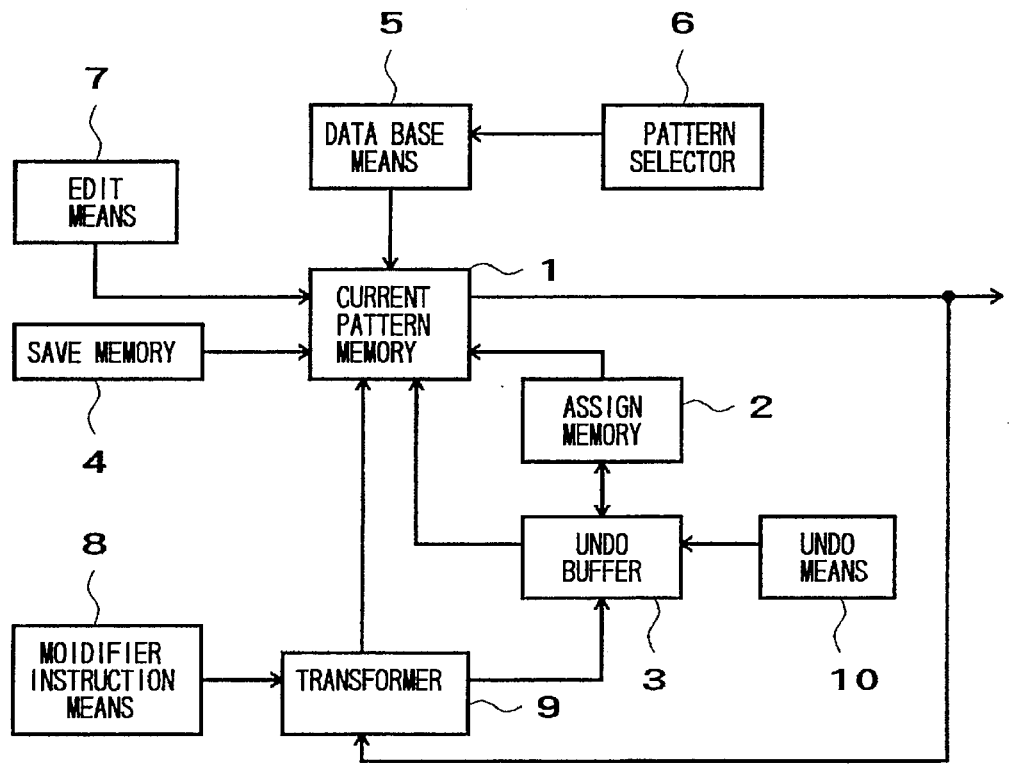
FIG. 1 is a function block diagram in the case where an electronic musical instrument and a personal computer shown in FIG. 2 jointly operate as an accompaniment pattern forming device.

FIG. 1 is a function block diagram illustrating functional relations in the case where the electronic musical instrument 1F and personal computer 20 shown in FIG. 2 cooperatively work as an accompaniment pattern forming device.

The operation of the accompaniment pattern forming device of FIG. 1 centers around a current pattern memory 1. The personal computer 20 carries out the automatic performance processing by sequentially reading out rhythm patterns from the current pattern memory 1.

The current pattern memory 1, assign memory 2, undo buffer 3 and save memory 4 in FIG. 1 correspond to predetermined areas in the RAM 23 shown in FIG. 3.

A data base means 5 corresponds to the hard disk device 24 of FIG. 2 and has many rhythm pattern data stored therein as shown in FIG. 3.

A pattern selector 6 corresponds to the drum pattern area keys and bank keys of note numbers D3, E3, F3 on the keyboard 1A.

Thus, by selecting a desired component within the data base by means of the pattern selector 6, corresponding rhythm pattern data is read out from the data base means 5 and supplied to the current pattern memory 1. In this embodiment, selection of a desired component can be done by operating the keys in the drum pattern area the keyboard 1A, and the selected component is designated by a note number generated from the keyboard 1A. Each component has plural rhythm patterns as previously mentioned, and, in this embodiment, selection as to which rhythm pattern of the designated component is to be read out is made depending on the magnitude of velocity data resulting from the keyboard operation.

Namely, because, as previously mentioned, the rhythm pattern data forming the respective banks within the data base 5 are sequentially arranged in accordance with the degree of pattern complexity, rhythm pattern data of a different complexity can be selected in accordance with the magnitude of velocity data.

The rhythm pattern data thus read out from the data base means 5 is stored into the current pattern memory 1 as the current pattern. The contents of the stored current pattern are modified or transformed in various ways by an edit means 7 and a transformer 9.

The edit means 7 corresponds to the replace input key of note number F#2, insert input key of note number G#2, quantize processing designation key of note number A#2, delete drum instruction key of note number C#3, delete component instruction key of note number D#3 and accent input key of note number F#3 which are all on the keyboard 1A shown in FIG. 2.

Here, the term "replace input" means replacing the original note event data of the current pattern with new note event data and storing the new note event data. The term "insert input" means additionally storing new note event data to original note event data of the current pattern. The term "quantize" means fitting the timing of note event to predetermined reference timing. Further, the term "accent" means reaccenting such drum sound of the current pattern which corresponds to an actuated or depressed key on the keyboard. The term "delete drum" means deleting only such drum of the current pattern which corresponds to an actuated key on the keyboard. Furthermore, the term "delete component" means deleting all drum sounds of the current pattern which forms a component corresponding to an actuated key on the operated keyboard.

A modifier instruction means 8 corresponds to the transformer designation keys of note numbers D2, E2, F2, G2, A2 on the keyboard 1A of FIG. 2.

The transformer 9 corresponds to transformer programs stored in the ROM 22 of FIG. 2. The contents of the current pattern are transformed in accordance with a modifier instructed by the modifier instruction means 8 corresponding to the transformer instruction keys. By only instructing such a modifier, the transformer 9 can obtain a pattern having a desired image.

An undo means 9 corresponds to the undo key of note number B2 on the keyboard 1A of FIG. 2.

The pattern modified by the transformer 9 is stored in the undo buffer 3, so that if a pattern as desired has not been obtained as the result of modification, the original pattern can be retrieved. Namely, because all modified patterns are sequentially stored into the undo buffer 3 in the order in which they have been modified, the original pattern can be retrieved by sequentially reading backwardly the undo buffer 3.

In this way, the current pattern having been changed or added with a new pattern can be stored into the assign memory 2, and then the pattern stored in the assign memory 2 can be read out at any time by actuating any of the keys in the pattern assign area on the keyboard 1A.

Now, various processing carried out by the CPU 11 of the electronic musical instrument 1F of FIG. 2 will be described with reference to FIGS. 5A to 5C.

In FIG. 5A, there is illustrated an example of main routine carried out by the CPU 11.

First, in response to switch-on of the power supply, the CPU 11 starts executing processing in accordance with control programs stored in the ROM 12. In initialization processing, various registers and flags within the RAM 13 are initialized. After that, the CPU 11 repetitively carries out key processing, MIDI massage reception processing and other processing in response to occurrence of respective events.

FIG. 5B illustrates the detail of the key processing of FIG. 5A.

In the key processing, it is determined whether the operational state of the keyboard 1A is a key-on state or a key-off state. Then, in accordance with the determination result, a MIDI note-on or note-off message is supplied via the MIDI interfaces 1D and 2C to the personal computer 20. According to this embodiment, even when the keyboard 1A is operated, the tone source circuit 17 is not actuated; namely, the tone source circuit 17 does not start its tone generation processing at the time of this key processing.

FIG. 5C illustrates the detail of the MIDI message reception processing of FIG. 5A.

This MIDI message reception processing is carried out each time a MIDI message is received from the personal computer 20 via the MIDI interfaces 2C and 1D. In this processing, it is determined whether the received MIDI message is a note-on message or not. If the received message is a note-on message (i.e., the determination result is YES), the note number, velocity data and note-on signal are supplied to the tone source circuit 17, so as to cause the circuit 17 to generate a tone. If, on the other hand, the received MIDI is a note-off message (NO), the program returns to the main routine. This is because, in this embodiment, the electronic musical instrument 1F works as a rhythm accompaniment device in which the note-off message is of no significant use.

In the other processing of FIG. 5A, various other processing than the above-mentioned processing are executed which includes such processing responsive to the actuation of other operating members on the switch panel 1B.

Now, various processing carried out by the CPU 20 in the personal computer of FIG. 2 will be described with reference to FIG. 6.

In FIG. 6A, there is illustrated an example of main routine carried out by the CPU 21.

First, in response to switch-on of the power supply, the CPU 21 starts executing processing in accordance with the control programs stored in the ROM 22. In an initialization processing, various registers and flags within the RAM 23 are initialized. After that, the CPU 21 carries out MIDI massage processing and display processing.

FIG. 6B illustrates the detail of the MIDI message reception processing of FIG. 6A.

This MIDI message reception processing is carried out each time a MIDI message is received from the electronic musical instrument 1F via the MIDI interfaces 1D and 2C. In this processing, it is determined whether the received MIDI message is a note-on message or not. If the received message is a note-on message (YES), processing as shown in FIGS. 7A to 10 is carried out which corresponds to the key-on note number. If, on the other hand, the received message is a note-off message (NO), processing as shown in FIGS. 11A and 11B is carried out which corresponds to the key-off note number.

In the display processing, such a process is carried out for showing on the display 29 which of the banks in the data base means 5 is being processed and showing on the display 29 the kind of drum sound being performed and also showing which part of the current pattern is being performed.

FIGS. 7A to 10D illustrate the detail of the processing of FIG. 6B corresponding to the note number which is carried out in such a case where the received MIDI message is a note-on message.

Figure 7A:
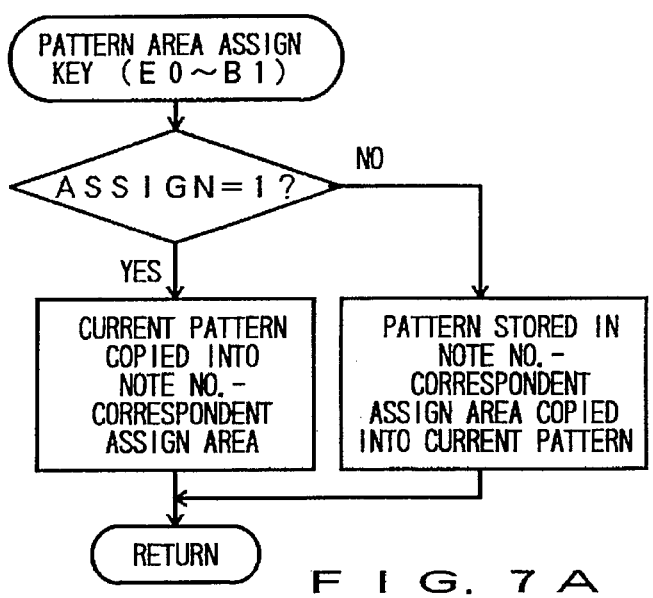
FIG. 7A is a flowchart illustrating the detail of the MIDI message reception processing of FIG. 6B which is carried out in such a case where a received MIDI message is a note-on message corresponding to any of pattern assign area keys of note numbers E0-B1.

The processing in FIG. 7A is pattern assign area key processing that is carried out when actuation has been made of any of the keys in the pattern assign area on the keyboard 1A corresponding to note numbers E0-B1 and a MIDI message containing any of note numbers E0-B1 has been received from the electronic musical instrument 1F.

In this pattern assign area key processing, it is first determined whether assign flag ASSIGN is at high level "1", and then processing is carried out depending on the determination result. More specifically, the assign flag ASSIN is set to high level "1" by assign key processing of FIG. 7B if key-on operation has been made of the assign key (key of note number C2), but the flag ASSIGN is set to low level "0" by a processing of FIG. 11A if key-off operation has been made of the assign key. Accordingly, if it has been ascertained that the assign flag ASSIGN is at high level "1" (the determination result is YES), this means that one of the keys in the pattern assign area and the assign key have been actuated simultaneously. In such a case, the current pattern in the current pattern memory 1 is copied into the assign memory area of the assign memory 2 which corresponds to the note number, and then the program returns to the main routine.

If, on the other hand, it has been ascertained that the assign flag ASSIGN is at low level "0" (the determination result is NO), this means that one of the keys in the pattern assign area alone has been actuated. In such a case, the rhythm pattern stored in the assign memory area of the assign memory 2 which corresponds to the note number of the actuated key is copied into the current pattern memory 1.

Namely, if any of the keys in the pattern assign area has been actuated while the assign key is being depressed, the rhythm pattern data then stored in the current pattern memory 1 is registered for the actuated key in the pattern assign area. If, however, only any of the keys in the pattern assign area has been actuated, the rhythm pattern previously registered for that key is read into the current pattern memory 1.

Figure 7B:
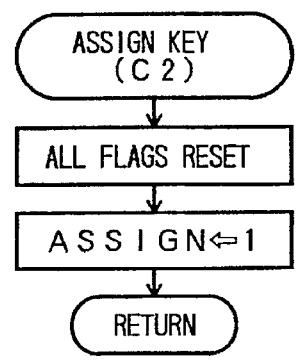
FIG. 7B is a flowchart illustrating the detail of the MIDI message reception processing of FIG. 6B which is carried out in such a case where a received MIDI message is a note-on message corresponding to an assign key of note number C2.

The processing shown in FIG. 7B is assign key processing that is carried out when actuation has been made of the assign key on the keyboard 1A which corresponds to note number C2 and a MIDI message containing such note number C2 has been received from the electronic musical instrument 1F. In this assign key processing, all associated flags are reset to low level "0" and the assign flag ASSIGN is set to "1", and then the program returns to the main routine.

Figure 7C:
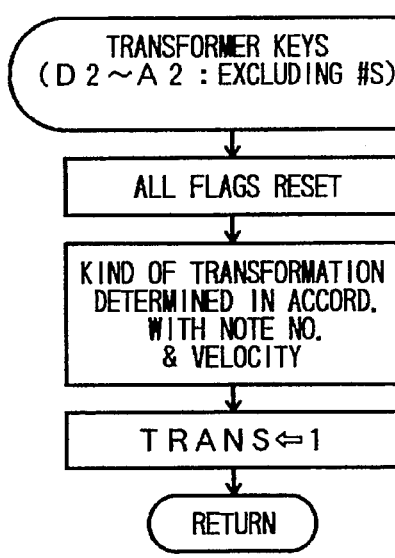
FIG. 7C is a flowchart illustrating the detail of the processing of FIG. 6B which is carried out in such a case where a received MIDI message is a note-on message corresponding to any of transformer keys of note numbers D2-A2 (excluding #s)

The processing shown in FIG. 7C is transformer key processing that is carried out when actuation has been made of one of the transformer keys on the keyboard 1A which correspond to note numbers D2-A2 (excluding #s) and a MIDI message containing such note numbers D2-A2 (excluding #s) has been received from the electronic musical instrument 1F.

The fact that a MIDI message containing any of note numbers D2-A2 (excluding #s) has been received from the electronic musical instrument 1F means that some kind of transformer modifier has been instructed. Therefore, in this transformer process, all associated flags are reset to low level "0" and the kind of transformer modifier is determined on the basis of the note number and velocity data. After that, transformer flag TRANS is set to "1", and then the program returns to the main routine.

In this embodiment, two modifiers are allotted to each of transformers 1–5, and either one of the two allotted modifiers is selected depending on the magnitude of velocity data. For instance, modifiers "Complex" and "Simple" representing complexing and simplifying processing respectively are allotted to transformer 1, "Hard" and "Soft" representing hardening and softening processing are allotted to transformer 2, and "Energetic" and "Calm" representing energizing and calming processing are allotted to transformer 3. Further, "Mechanical" and "Graceful" representing mechanizing and gracing processing are allotted to transformer 4, and "Stuttering" and "Floating" representing stuttering and floating processing are allotted to transformer 5.

For each of transformers 1–5, the first-said modifier is selected when the magnitude of velocity data is equal to or smaller than a predetermined value, and the second-said modifier is selected when the magnitude of velocity data is greater than the predetermined value.

When the transformer flag TRANS is at high level "1", transformer 9 executes transformer key processing of FIG. 14D to change the contents of the current pattern in accordance with the selected modifier.

Each of the processing represented by the above-mentioned modifiers will be described below.

The complexing processing (Complex) is done in either of the following two styles. In the first style, the complexing processing is achieved by searching through the data base means 5 for a triplet note pattern(or partial rhythm pattern) corresponding to a preselected pattern prototype called "template" and then adding the searched-out note pattern to the current pattern. In the second style, the complexing processing is achieved by randomly extracting from the data base means 5 such drum sound which constitutes a non-crash component and then adding the extracted drum sound to the current pattern.

The simplifying processing (Simple) is done in any of the following three styles. In the first style, the simplifying processing is achieved by searching through the data base means 5 for a rhythm pattern which is closer to a basic rhythm pattern than that of bus drum (BD) and snare drum (SD) of the current pattern, and then replacing the current pattern with the searched-out rhythm pattern. In the second style, the simplifying processing is achieved by searching through the data base means 5 for a rhythm pattern which is closer to a basic rhythm pattern than that of high-hat (HHC, HHO) in the current pattern, and then replacing the current pattern with the searched-out rhythm pattern. In the third style, the simplifying processing is achieved by removing, from the current pattern, rhythm pattern of a component comprising drum sounds other than those of the above-mentioned bus drum (BD), snare drum (SD) or high-hats (HHC, HHO).

The hardening processing (Hard) is done in either of the following two styles. In the first style, the processing is achieved by uniformly increasing all the velocity data of the rhythm pattern in the current pattern. In the second style, the processing is achieved by changing the drum sounds in the current pattern from those of a softening component to those of a hardening component.

Here, among such drum sounds forming the hardening component is bus drum (BD), snare drum (SD), tom-tom (Tom H, Tom M, Tom L), cowbell (Cowbell), agogo (Agogo H, Agogo L), hand claps (Claps) and crash cymbals (Crash CY), while among such drum sound forming the softening component is claves (Clave), tambourine (Tamb), high-hat (HHC, HHO), ride cymbals (CY), conga (Conga H, Conga L), wood block and shaker. Wood block and shaker are listed here just by way of example as the softening component forming drum sound, although they are not actually allotted to the keyboard 1A in this embodiment.

The softening processing (Soft) is done in either of the following two styles. In the first style, the processing is achieved by uniformly decreasing all the velocity data of the rhythm pattern in the current pattern. In the second style, the processing is achieved by changing the drum sounds in the current pattern from those of a hardening component to those of a softening component.

Further, the energizing processing (Energetic) is done in any of the following three styles. In the first style, the processing is achieved by increasing the number of template-based note patterns within the current pattern. In the second style, the processing is achieved by causing the tempo speed to approach about 120. In the third style, the processing is achieved by causing the rhythm pattern in the current pattern to approach a triplet rhythm pattern on the basis of the template (shuffling process).

The calming processing (Calm) is done in any of the following three styles. In the first style, the processing is achieved by decreasing the number of the number of template-based note patterns within the current pattern. In the second style, the processing is achieved by causing the tempo speed to approach an approximate value of 60. In the third style, the processing is achieved by causing the rhythm pattern in the current pattern to approach a non-triplet rhythm pattern on the basis of the template (non-shuffling process).

Furthermore, the mechanizing processing (Mechanical) is done in any of the following four styles. In the first style, the processing is achieved by quantizing the rhythm pattern in the current pattern to within a resolution of sixteenth note. In the second style, the processing is achieved by, on the basis of a template for bus drum (BD) or snare drum (SD), quantizing the rhythm pattern in the current pattern to within a resolution of eighth note. In the third style, the processing is achieved by changing the drum sounds in the current pattern from those of a softening component to those of a hardening component. In the fourth style, the processing is achieved by compressing the velocity data to a value centering around 90.

Furthermore, the gracing processing (Graceful) is done in any of the following four styles. In the first style, the processing is achieved by extending the velocity data in opposite directions about a value of 64. In the second style, the processing is achieved by adding triplet note pattern to the current pattern on the basis of a template. In the third style, the processing is achieved by changing the drum sounds in the current pattern from those of a hardening component to those of a softening component. In the fourth style, the processing is achieved by applying flutter (decorative sound) to the drum sound in the current pattern.

Moreover, the stuttering processing (Stuttering) is done in either of the following two styles. In the first style, the processing is achieved by, on the basis of a template, replacing downbeat in the rhythm pattern of the current pattern with upbeat (syncopation process). In the second style, the processing is achieved by adding triplet note pattern to the current pattern on the basis of a template.

Finally, the floating processing (Floating) is done in any of the following five styles. In the first style, the processing is achieved by, on the basis of a template, replacing upbeat in the rhythm pattern of the current pattern with downbeat (non-syncopation process). In the second style, the processing is achieved by, on the basis of a template, decreasing the number of triplet note patterns in the current pattern. In the third style, the processing is achieved by, on the basis of a template, adding 12/8-triplet note pattern to the current pattern. In the fourth style, the processing is achieved by changing the drum sounds in the current pattern from those of a hardening component to those of a softening component. In the fifth style, the processing is achieved by causing the tempo speed to approach to an approximate value of 120.

Figure 7D:
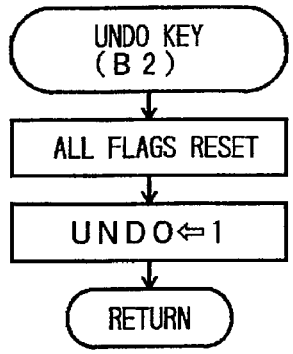
FIG. 7D is a flowchart illustrating the detail of the processing of FIG. 6B which is carried out in such a case where a received MIDI message is a note-on message corresponding to an undo key of note number B2.

The processing of FIG. 7D is undo key processing which is carried out when actuation has been made of the undo key corresponding to note number B2 on the keyboard 1A and thus a MIDI message containing such note number B2 has been received from the electronic musical instrument 1A.

In the undo key processing, all associated flags are first reset to low level "0" and then undo flag UNDO is set to "1", after which the program returns to the main routine.

When the undo flag UNDO is at high level "1", the undo means 10 in FIG. 1 executes undo process as shown in FIG. 14A to read out one of the previous rhythm patterns and then copy the read-out rhythm pattern into the current pattern. In this way, if the pattern changed by the transformer 9 is not satisfactory, any desired previous rhythm pattern can be restored. Namely, because in this embodiment the undo buffer 3 sequentially stores a total of 20 rhythm patterns, it is possible to restore any desired previous pattern by reading backwardly the buffer 3 in response to actuation of the undo key.

Figure 7F:
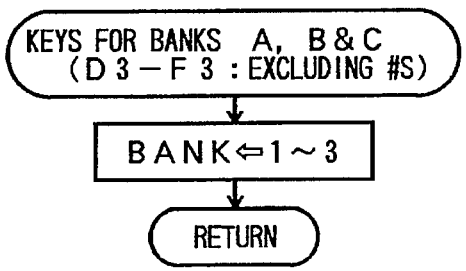
FIG. 7F is a flowchart illustrating the detail of the processing of FIG. 6B which is carried out in such a case where a received MIDI message is a note-on message corresponding to any of bank keys of note numbers D3-F3 (excluding #s)
Figure 7E:
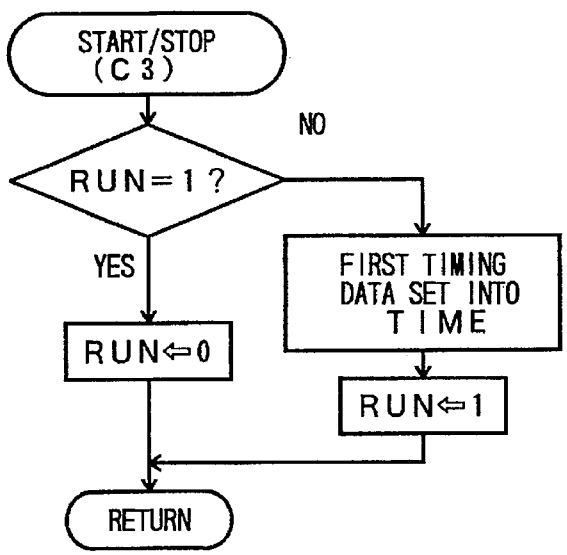
FIG. 7E is a flowchart illustrating the detail of the processing of FIG. 6B which is carried out in such a case where a received MIDI message is a note-on message corresponding to a start/stop key of note number C3.

The processing of FIG. 7E is start/stop key processing which is carried out when actuation has been made of the start/stop key corresponding to note number C3 on the keyboard 1A and thus a MIDI message containing such note number C3 has been received from the electronic musical instrument 1F.

In this start/stop key processing, it is determined whether run state flag RUN is at high level "1", and different processing is executed depending on the determination result. The run state flag RUN indicates whether the current pattern is being read out from the current pattern memory 1.

Therefore, if it has been ascertained that the run state flag RUN is at high level "1" (YES), the flag RUN is set to low level "0" to stop reading, and then the program returns to the main routine. If it has been ascertained that the run state flag RUN is at low level "0" (NO), the first timing data in the current pattern memory 1 is set into timing register TIME to start reading and the run state flag RUN is set to high level "1", and then the program returns to the main routine. In response to this, current patterns are sequentially read out from the current pattern memory 1 by timer interrupt processing of FIG. 12.

The processing of FIG. 7F is bank key processing which is carried out when actuation has been made of one of the bank keys for banks A–C corresponding to note numbers D3-F3 (excluding #s) on the keyboard 1A and thus a MIDI message containing such note numbers D3-F3 (excluding #s) has been received from the electronic musical instrument 1F.

In this bank key processing, one of the values "1", "2" and "3" is stored into bank register BANK, and then the program returns to the main routine. According to the embodiment, "1" is stored when actuation has been made of the bank key for bank A corresponding note number D3, "2" is stored when actuation has been made of the bank key for bank B corresponding note number E3, and "3" is stored when actuation has been made of the bank key for bank C corresponding note number F3. In this manner, bank switching in the data base means 5 is effected depending on the bank key actuated. Then, when a component has been designated later, a specific rhythm pattern is read out from that bank and stored into the current pattern memory 1.

Figure 8A:
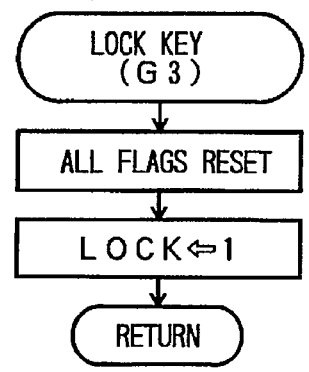
FIG. 8A is a flowchart illustrating in detail the processing of FIG. 6B which is carried out in such a case where a received MIDI message is a note-on message corresponding to a lock key of note number G3.

FIG. 8A illustrates lock key processing which is carried out when actuation has been made of the lock key corresponding to note number G3 on the keyboard 1A and thus a MIDI message containing that note number G3 has been received from the electronic musical instrument 1F.

In this lock key processing, all associated flags are reset to low level "0" and lock flag LOCK is set to high level "1", after which the program returns to the main routine.

The rhythm pattern read out from the data base means 5 is normally available or effective only when any of the keys in the drum pattern area is being operated, but by actuating this lock key, the contents of the rhythm pattern are made effective or locked so that the rhythm pattern remains available even after the key in the drum pattern area is released.

Figure 8B:
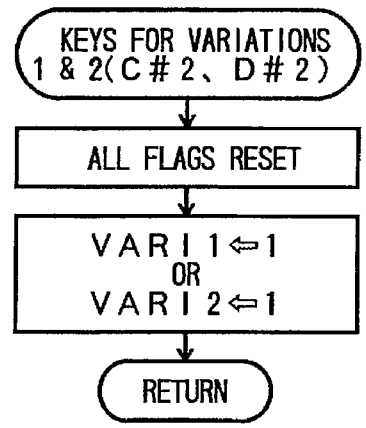
FIG. 8B is a flowchart illustrating the detail of the processing of FIG. 6B which is carried out in such a case where a received MIDI message is a note-on message corresponding to any of variation keys of note numbers C#2 and D#2.

FIG. 8B illustrates variation key processing which is carried out when actuation has been made of any of the keys for variations 1 and 2 corresponding to note numbers C#2 and D#2 on the keyboard 1A and thus a MIDI message containing such note numbers C#2 and D#2 has been received from the electronic musical instrument 1F.

In this variation key processing, all associated flags are first reset to low level "0" and then variation flags VAR1 and VAR12 are set to high level "1", after which the program returns to the main routine. This causes a variation pattern (modifier sequence of FIG. 3) to be read out when the current pattern readout has advanced to a measure bar.

Figure 8C:
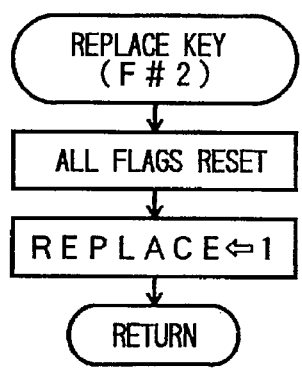
FIG. 8C is a flowchart illustrating the detail of the processing of FIG. 6B which is carried out in such a case where a received MIDI message is a note-on message corresponding to a replace key of note number F#2.

FIG. 8C illustrates replace key processing which is carried out when actuation has been made of the replace key corresponding to note number F#2 on the keyboard 1A and thus a MIDI message containing such note number F#2 has been received from the electronic musical instrument 1F.

In this replace key processing, all associated flags are first reset to low level "0" and then replace flag REPLACE is set to high level "1", after which the program returns to the main routine. Consequently, when any of the keys in the drum pattern area has been actuated while the replace key is being depressed, processing of FIG. 9D is executed such that the corresponding drum sound is newly input to the position of the key operation timing, replacing the preceding corresponding drum sound.

Figure 8D:
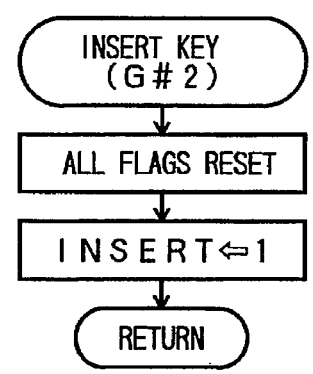
FIG. 8D is a flowchart illustrating the detail of the processing of FIG. 6B which is carried out in such a case where a received MIDI message is a note-on message corresponding to an insert key of note number G#2.

FIG. 8D illustrates insert key processing which is carried out when actuation has been made of the insert key corresponding to note number G#2 on the keyboard 1A and thus a MIDI message containing such note number G#2 has been received from the electronic musical instrument 1F.

In this insert key processing, all associated flags are reset to low level "0" and then insert flag INSERT is set to high level "1", after which the program returns to the main routine. Consequently, when any of the keys in the drum pattern area has been actuated while the replace key is being depressed, the corresponding drum sound is newly input to the position of the key operation timing. Thus, the new drum sound is added without the preceding drum sound being eliminated.

Figure 8E:
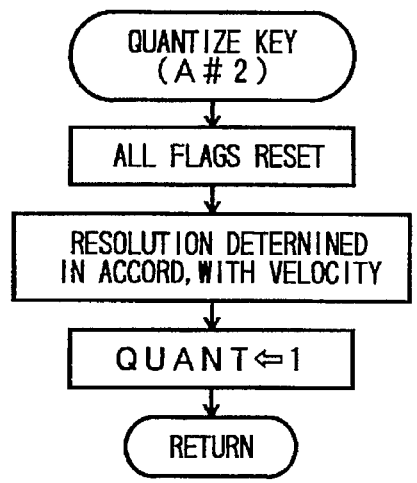
FIG. 8E is a flowchart illustrating the detail of the processing of FIG. 6B which is carried out in such a case where a received MIDI message is a note-on message corresponding to a quantize key of note number A#2.

FIG. 8E illustrates quantize key processing which is carried out when actuation has been made of the quantize key corresponding to note number A#2 on the keyboard 1A and thus a MIDI message containing such note number A#2 has been received from the electronic musical instrument 1A. In this quantize key processing, all associated flags are reset to low level "0", a quantizing resolution is determined on the basis of a then-detected velocity data magnitude, and then quantize flag QUANT is set to high level "1". After that, the program returns to the main routine.

Consequently, once the current pattern readout has advanced to a measure line, a quantizing process is applied, in reading out rhythm patterns after the next measure line, to the data readout timing, without the data themselves being rewritten. Such processing is called quantize processing.

Figure 8F:
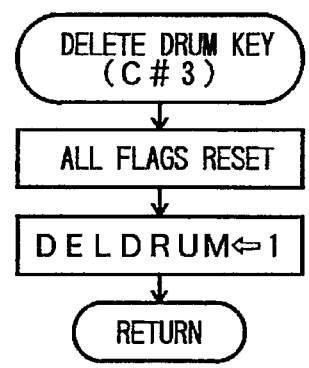
FIG. 8F is a flowchart illustrating the detail of the processing of FIG. 6B which is carried out in such a case where a received MIDI message is a note-on message corresponding to a delete drum key of note number C#3.

FIG. 8F illustrates delete drum key processing which is carried out when actuation has been made of the delete drum key corresponding to note number C#3 on the keyboard 1A and thus a MIDI message containing such note number C#3 has been received from the electronic musical instrument 1F.

In this delete drum key processing, all associated flags are reset to low level "0" and then delete drum flag DELDRUM is set to high level "1", after which the program returns to the main routine. Consequently, once a note-on message of, for example, note number C4 has been detected later, the drum sound corresponding to note number C4 is eliminated from the current pattern.

FIG. 9A illustrates delete component key processing which is carried out when actuation has been made of the delete component key corresponding to note number D#3 on the keyboard 1A and thus a MIDI message containing note number D#3 has been received from the electronic musical instrument 1F.

In this delete component key processing, all associated flags are reset to low level "0" and then delete component flag DELCOMP is set to high level "1", after which the program returns to the main routine. Consequently, once a note-on message of, for example, note number C4 has been detected later, all drum sounds of each component containing note number C4 are eliminated from the current pattern.

FIG. 9B illustrates accent key processing which is carried out when actuation has been made of the accent key corresponding to note number F#3 on the keyboard 1A and thus a MIDI message containing note number F#3 has been received from the electronic musical instrument 1F.

In this accent key processing, all associated flags are reset to low level "0" and then accent flag ACCENT is set to high level "1", after which the program returns to the main routine. Consequently, once a note-on message of, for example, note number C4 has been detected later and a note event of the same note number has been read out before a corresponding note-off message of the note number is detected, the velocity of the note event is rewritten into the note-on velocity of C4.

FIG. 9C illustrates fill-in key processing which is carried out when actuation has been made of the fill-in key corresponding to note number G#3 on the keyboard 1A and thus a MIDI message containing note number G#3 has been received from the electronic musical instrument 1F.

In this fill-in key processing, all associated flags are reset to low level "0" and then the current pattern in the current pattern memory 1 is temporarily saved into the save memory 4. Subsequently, a fill-in pattern in the corresponding bank A, B, C in the data base means 5 is copied into the current pattern memory 1, and detection is made of its readout position (position in the pattern corresponding to the timing within the current measure). After that, fill-in flag FILL is set to high level "1", and then the program returns to the main routine. Consequently, the fill-in pattern is performed from the time of actuation of the fill-in key corresponding to note number G#3 through to the end of the measure.

FIG. 9D illustrates drum key processing which is carried out when actuation has been made of any of the keys in the drum pattern area corresponding to note numbers A3-E5 on the keyboard 1A and thus a MIDI message containing these note numbers A3-E5 has been received from the electronic musical instrument 1F.

In this drum key processing, it is determined whether any of the flags other than the lock flag LOCK (the replace flag REPLACE, insert flag INSERT, delete drum flag DELDRUM and delete component flag DELCOMP) is at high level "1", and different processing is executed depending on the determination result.

Namely, if the note number is one of A3-E5, this represents designation of a drum sound (single sound) or of a component. So, if it has been ascertained that any of the flags other than the lock flag LOCK is at high level "1" (YES), first flag-correspondent processing corresponding to the high level flag is carried out, and then the CPU returns to the main routine. The first flag-correspondent processing is illustrated in detail in FIG. 10.

It, on the other hand, it has been ascertained that none of the flags other than the lock flag LOCK is at high level "1" (NO), one or more drum sounds of the component corresponding to the actuated drum pattern area key (note number) are removed from the current pattern and temporarily stored into the save memory 4. Then, rhythm pattern of the component corresponding to the actuated key (note number), velocity data and bank is read out from the data base means 5 and added to the current pattern.

Consequently, only by actuating one of the keys corresponding to A3-E5, it is allowed to selectively add the rhythm pattern of the component corresponding to the note number, in accordance with the magnitude of velocity data. Since, as previously mentioned, the rhythm patterns stored in the data base means 5 are arranged to become more complex as the velocity value becomes greater, it is possible to finely select the kind of rhythm pattern.

FIGS. 10A to 10D illustrates the detail of the first flag-correspondent processing which is carried out when any of the flags other than the lock flag LOCK, i.e., the replace flag REPLACE, insert flag INSERT, delete drum flag DELDRUM and delete component flag DELCOMP is at high level "1". The first flag-correspondent processing includes a replace process, insert process, delete drum process and delete drum process.

More specifically, FIG. 10A illustrates the replace process which is carried out when any of the keys in the drum pattern area has been actuated to select a drum sound while the replace key corresponding to note number F#2 on the keyboard 1A is in the depressed, i.e., ON state. Namely, during the time when the replace key is in the depressed state, the replace flag REPLACE is set at high level "1" as the result of the replace key processing of FIG. 8C, and accordingly, it is ascertained in the drum key processing of FIG. 9D that the replace flag REPLACE other than the lock flag LOCK is at high level "1". Such an ascertainment in the drum key processing triggers this replace process.

In this replace process, the selected drum sound corresponding to the actuated key is added to the current pattern along with the associated velocity data. Subsequently, the delete flag corresponding to the selected drum sound is set to high level "1", and then the program returns to the drum key processing of FIG. 9D. The actuated drum sound for which delete flag has thus been set to high level "1" is removed from the current pattern in step 54 of FIG. 13.

FIG. 10B illustrates the insert process which is carried out when any of the keys in the drum pattern area has been actuated to select a drum sound while the insert key corresponding to note number G#2 on the keyboard 1A is in the depressed state. Namely, during the time when the insert key is in the depressed state, the insert flag INSERT is set at high level "1" as the result of the insert key processing of FIG. 8D, and accordingly, it is ascertained in the drum key processing of FIG. 9D that the insert flag INSERT other than the lock flag LOCK is at high level "1". Such an ascertainment in the drum key processing triggers the insert process.

In this insert process, the selected drum sound corresponding to the actuated key is added to the current pattern along with the associated velocity data, and then the program returns to the drum key processing of FIG. 9D.

FIG. 10C illustrates the delete drum process which is carried out when any of the keys in the drum pattern area has been actuated to select a drum sound while the delete drum key corresponding to note number C#3 on the keyboard 1A is in the depressed state. Namely, during the time when the delete drum key is in the depressed state, the delete drum flag DELDRUM is set at high level "1" as the result of the delete drum key processing of FIG. 8F, and accordingly, it is ascertained in the drum key processing of FIG. 9D that the delete drum flag DELDRUM other than the lock flag LOCK is at high level "1". Such an ascertainment in the drum key processing triggers the delete drum process.

In this delete drum process, the delete flag corresponding to the selected drum sound is set to high level "1", and then the program returns to the drum key processing of FIG. 9D. The selected drum sound for which delete flag has thus been set to high level "1" is removed from the current pattern in step 54 of FIG. 13.

FIG. 10D illustrates the delete drum process which is carried out when any of the keys in the drum pattern area has been actuated to select a drum sound while the delete component key corresponding to note number D#3 on the keyboard 1A is in the depressed state. Namely, during the time when the delete component key is in the depressed state, the delete component flag DELCOMP is set at high level "1" as the result of the delete component key processing of FIG. 9A, and accordingly, it is ascertained in the drum key processing of FIG. 9D that the delete component flag DELCOMP other than the lock flag LOCK is at high level "1". Such an ascertainment in the drum key processing triggers the delete drum process.

In this delete drum process, the delete flag corresponding to a component containing the selected drum sound is set to high level "1", and then the program returns to the drum key processing of FIG. 9D. The drum sound forming the component for which delete flag has thus been set to high level "1" is removed from the current pattern in step 54 of FIG. 13.

FIGS. 11A and 11B illustrate in detail the note number-correspondent processing of FIG. 6B which is carried out in such a case where a received MIDI message is a note-off message.

More specifically, when actuation has been made of the assign key corresponding to note number C2 on the keyboard 1A, lock key corresponding to note number G3, replace key corresponding to note number F#2, insert key corresponding to note number G#2, quantize key corresponding to note number A#2, delete drum key corresponding to note number C#3, delete component key corresponding to note number D#3, or accent key corresponding to note number F#3, and thus a MIDI message containing such note number C2, G3, F#3, G#2, A#2, C#3, D#3 or F#3 has been received from the musical instrument 1F, the processing of FIG. 11A is executed for clearing the flag which has been set to high level "1" in one of the key processing of FIGS. 7 to 9 corresponding to the above-mentioned note numbers.

The processing of FIG. 11B is drum key processing which is executed when any of the drum pattern area keys corresponding to note numbers A3-E5 has been released or deactuated and thus a MIDI message containing a note-off message of any of note numbers A3-E5 has been received from the electronic musical instrument 1F.

In this drum key processing, it is first determined whether or not the lock flag LOCK is at low level "0". The CPU 21 executes the following operations if the determination result is YES, but if the result is NO, it returns to the main routine of FIG. 6A in order to make a rhythm pattern being read out from the data base means 5 effective.

If the lock flag LOCK is at low level "0", the drum sound (single sound) or component drum sounds corresponding to the released key are removed from the current pattern, and the component drum sounds previously saved in the processing of FIG. 9D are restored into the current pattern.

Figure 12:
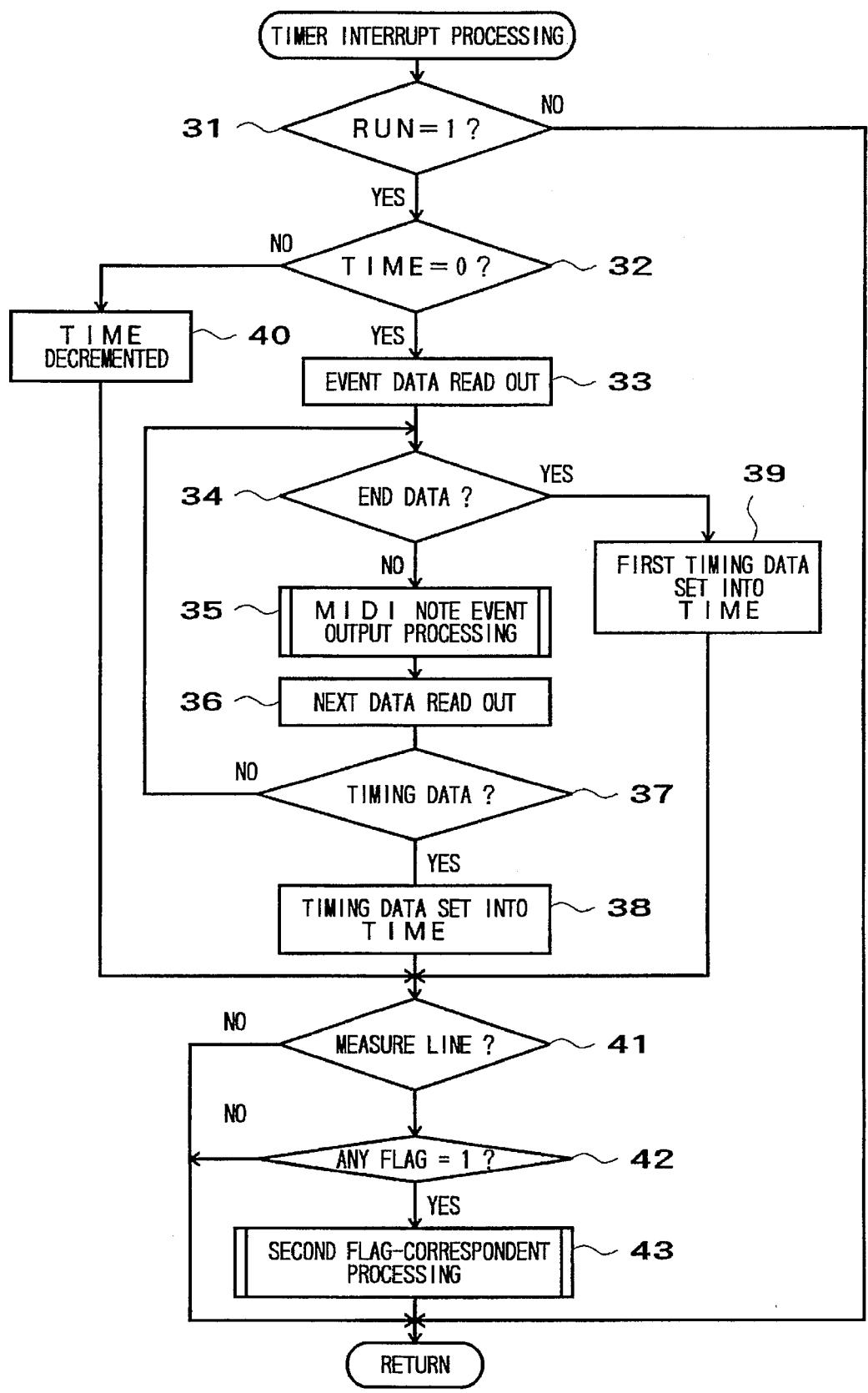
FIG. 12 is a flowchart of timer interrupt processing which is carried out at an interrupt rate of 24 times per quarter note.

FIG. 12 is a flowchart of timer interrupt processing which is carried out at an interrupt rate of, for example, 480 times per quarter note. This timer interrupt processing is conducted in accordance with the tempo at which current pattern is read out from the current pattern memory 1; that is, the interrupt period can be varied with the readout tempo. The timer interrupt processing is carried out in the following sequence.

Step 31: It is determined whether or not the run state flag RUN is at high level "1". If the flag RUN is at high level "1" (YES), the program goes to next step 32; otherwise (NO), the program returns to the main routine.

Step 32: It is determined whether or not the value of time register TIME storing the timing data is "0", i.e., the time to a next note event has passed. If the value is "0" (YES) meaning that the time to the next note has passed, the program goes to next step 33. But if the value is not "0" (NO) meaning that the time to the next note event has not passed, the program goes to step 40.

Step 33: Because of the ascertainment in the above-mentioned step 32 that the time to the next note event has passed, this step reads out event data corresponding to the timing.

Step 34: It is determined whether or not the event data read out in the above-mentioned step 33 is end data. The program goes to step 39 if the read-out data is end data, but it goes to step 35 if the read-out data is other than end data.

Step 35: Because of the ascertainment in step 43 that the event data read out in step 33 is other than end data, a MIDI note event (MIDI message) is output to the electronic musical instrument 1F via the MIDI interfaces 2C and 1D as will be described in detail later.

Step 36: Data next to the event data having been read out in step 33 is read out.

Step 37: It is determined whether or not the data read out in step 36 is timing data. The program goes to step 38 if the determination result is YES, but otherwise it goes back to step 34. Therefore, if the data read out in step 36 is end data, YES determination is obtained in step 34 and then step 39 is taken, but if the read out data is event data, steps 35 and 36 are taken.

Step 38: The read-out timing data is set into the time register TIME.

Step 39: Because of the ascertainment in step 34 that the read-out data is end data, the first timing data of the rhythm pattern is set into the time register TIME, and the program goes to step 41.

Step 40: Because of the ascertainment in step 32 that the time has not passed, the time register TIME is decremented only by one, and then the program goes to step 41.

Step 41: It is determined whether or not the stored value in the time register TIME coincides with the timing of measure line. The program goes to step 41 if the determination result is YES, but it returns to the main routine if the result is NO.

Step 42: It is determined whether or not any of the flags is at high level "1". If any of the flags is at high level "1" (YES), step 43 is taken, but if NO, the processing returns to the main routine.

Step 43: Because it has been ascertained in step 42 that any of the flags is at high level "1", second flag-correspondent processing corresponding to the flag at high level "1" is executed, and then the program returns to the main routine. The detail of the second flag-correspondent processing will be described later in connection with FIG. 14.

Figure 13:
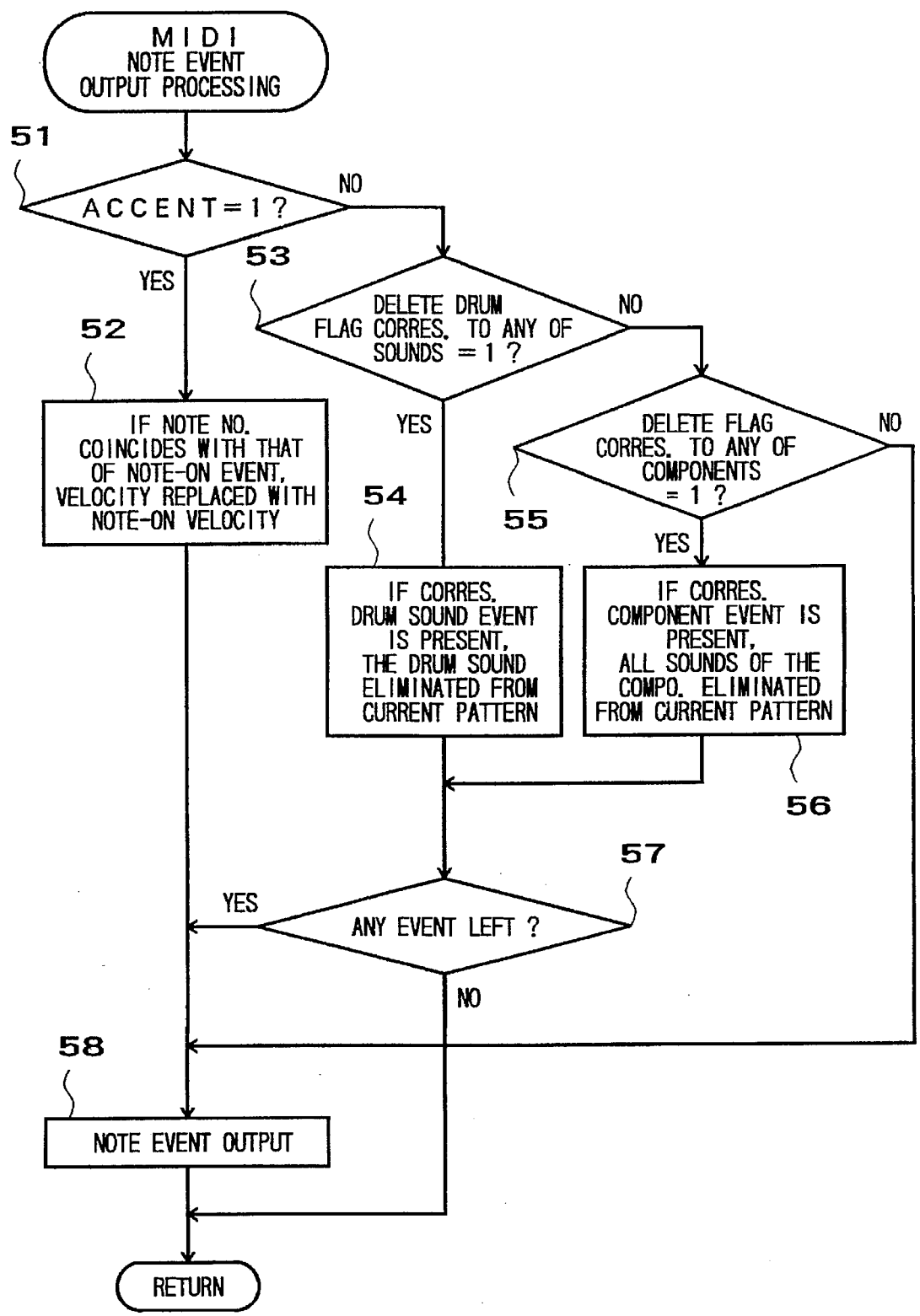
FIG. 13 is a flowchart illustrating the detail of MIDI note event output processing carried out in step 35 shown in FIG. 12.

FIG. 13 is a flowchart illustrating the detail of the MIDI note event output processing shown in step 35 of FIG. 12.

In this MIDI note event output processing, if any of the accent flag ACCENT, delete drum flag DELDRUM and delete component flag DELCOMP is at high level "1", specific processing corresponding to the high level flag is carried out. Otherwise, note event output processing is carried out which corresponds to the rhythm pattern in the current pattern memory 1. This processing is executed in the following sequence.

Step 51: It is determined whether or not the accent key corresponding to note number F#3 on the keyboard 1A has been actuated or depressed and thus the accent flag ACCENT is at high level "1". If YES, next step 52 is taken, but if NO, step 53 is taken.

Step 52: If the note number of the read-out note event coincides with the note number of the received note event (note-on event), the velocity of the read-out note event is replaced with that of the received note-on message.

Step 53: It is determined whether or not the delete drum key corresponding to note number C#3 on the keyboard 1A has been depressed and thus the delete drum flag DELDRUM corresponding to any of the drum sounds has been set to high level "1". If the determination result is YES, step 54 is taken, but if NO, step 55 is taken.

Step 54: If event of the drum sound corresponding to the received note number is present among the events read out from the current pattern memory 1, the drum sound is eliminated from the read-out current pattern events.

Step 55: It is determined whether or not the delete component key corresponding to note number D#3 on the keyboard 1A has been depressed and thus the delete component flag DELCOMP corresponding to any of the components has been set to high level "1". If the determination result is YES, step 56 is taken, but if NO, step 59 is taken.

Step 56: If event of the drum sounds forming the component corresponding to the received note number is present among the current pattern events read out from the current pattern memory 1, all the drum sounds of the component are eliminated from the read-out current pattern events.

Step 57: It is determined whether or not there is still any event left in the read-out current pattern after the drum sound elimination in steps 54 and 56 above. The program goes to step 58 if the determination result is YES, but if NO, it returns to the main routine and then goes to step 36 of FIG. 12.

Step 58: Each note event which has undergone the accent processing in step 52 or which has been left uneliminated in step 52 or which has not undergone the operations in steps 52, 54, 56 is output to the electronic musical instrument 1F via the MIDI interfaces 2C and 1D.

FIGS. 14A to 14D illustrate the detail of the second flag-correspondent processing of step 43 in FIG. 12.

The second flag-correspondent processing includes the following four processes which are carried out depending on which of the undo flag UNDO, fill-in flag FILL-IN, variation flags VARI1, VARI2 and transformer flag TRANS is at high level "1".

FIG. 14A illustrates an undo process which is carried out when the undo flag UNDO is set at high level "1" (UNDO=1) in response to depression or actuation of the undo key corresponding to note number B2 on the keyboard 1A.

In this undo process, the latest rhythm pattern stored in the undo buffer 3 is read out and transferred into the current pattern memory 1 as a current pattern, and then the undo flag UNDO is reset to low level "0".

FIG. 14B illustrates a fill-in restoration process which is carried out when the fill-in flag FILL is set at high level "1" (FILL=1) in response to depression of the fill-in key corresponding to note number G#3 on the keyboard 1A.

In this fill-in restoration process, rhythm pattern having been previously saved in the save memory 4 is read out and copied into the current pattern memory 1 as a current pattern, and then the fill-in flag FILL is reset to low level "0".

FIG. 14C illustrates a variation process which is carried out when either of the variation flags VARI1 or VARI2 is set at high level "1" (VARI1 or VARI2=1) in response to depression of the variation key corresponding to note number D#2 or C#2 on the keyboard 1A.

In this variation process, because variation is being instructed, a next (or first) modifier is read out from the modifier variation sequence of FIG. 3 and instructed to the transformer 9. For instance, in the case where the modifier variation sequence contains data covering four measures, the variation process is repetitively executed to complete four times of such modifier readout, with one modifier read out per execution. When four times of the modifier readout have been completed, the variation flag VARI1 or VARI2 is reset to low level "0".

FIG. 14D illustrates a transformer process which is carried out when the transformer flag TRANS is set at high level "1" (TRANS=1) in response to depression of any of the transformer key corresponding to note number D2, E2, F2, G2 or A2 on the keyboard 1A.

In this transformer process, the current pattern in the current pattern memory 1 is copied into the undo buffer 3, and then, as will be described in detail below, specific operations are executed for changing the contents of the current pattern in accordance with the instructed modifier. After that the transformer flag TRANS is reset to low level "0".

Figure 17:
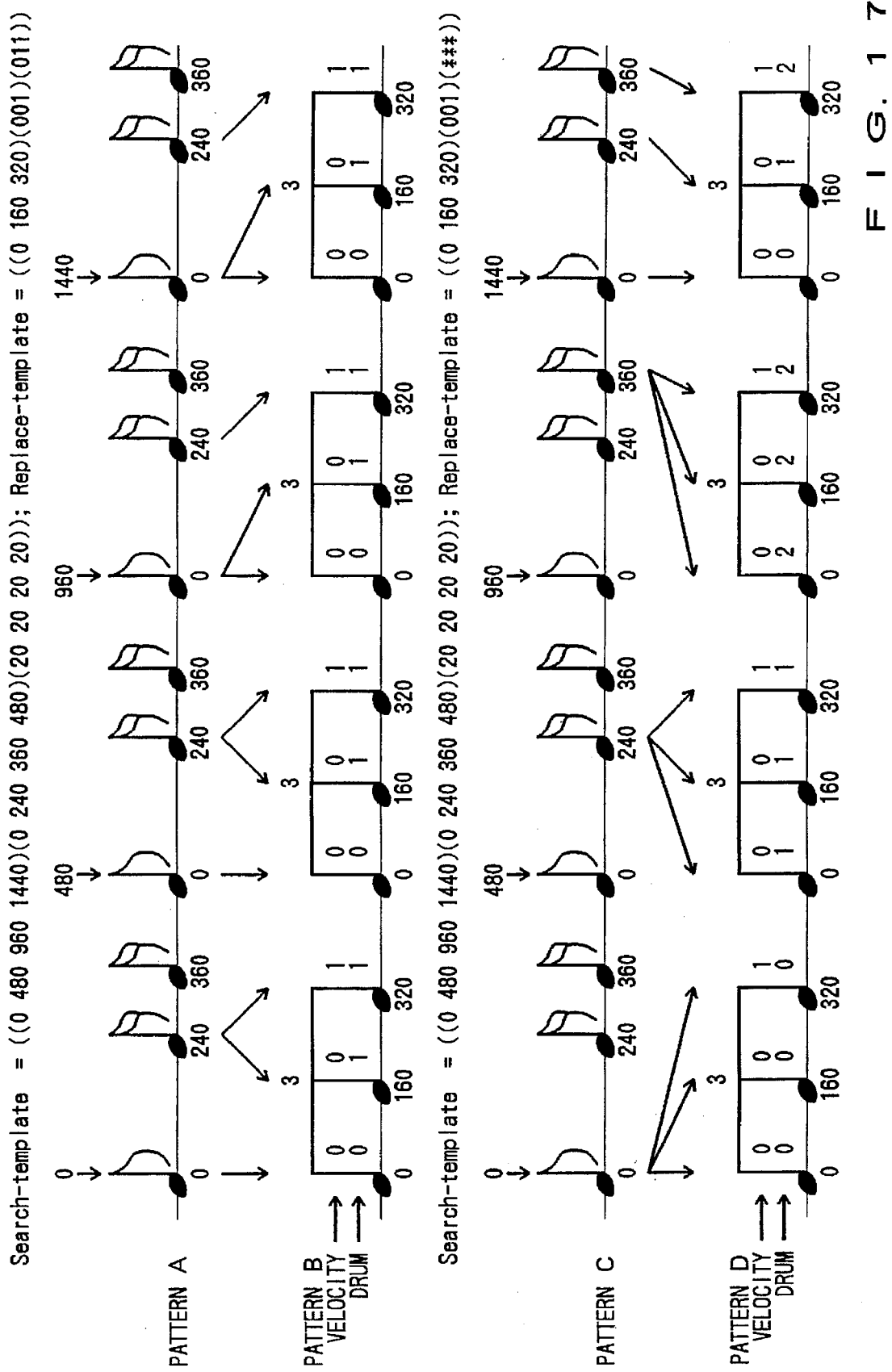
FIG. 17 is a diagram showing a manner in which the drum sound and velocity of a current pattern are replaced in the transformer process.

FIGS. 15 to 17 are score diagrams illustrating the operations for changing the current pattern in the transformer process.

The pattern changing transformer process shown in FIGS. 15 to 17 searches a note pattern to be changed on the basis of a search template (Search-template) and changes the searched-out note pattern into a predetermined note pattern on the basis of a replace template (Replace-template). In other words, a note pattern corresponding to the search template is replaced with a note pattern corresponding to the replace plate.

In the illustrated example, the search template has a data format of Search-template=(offset data) (search data) (error range data), while the replace template has a data format of Replace-template=(replace data) (velocity selection data) (drum sound selection data).

The search data and replace data each contain a rhythm pattern expressed in timing data. It is assumed in this embodiment that the values of timing data corresponding to a quarter note, eighth note, sixteenth note and thirty-second note are "480", "240" and "120" and "60", respectively. Thus, search data (0 240 360 480) of the search template shown in FIG. 15 represents a note pattern equal to one quarter note which is composed of one eighth note and two sixteenth notes, while replace data (0 160 320) of the replace template represents a triplet note pattern equal to one quarter note.

In FIG. 15, the search template is expressed as "Search-template=((0 480 960 1440) (0 240 360 480) (20 20 20 20))", and the replace template is expressed as "Replace-template=((0 160 320) (001) (011))".

The offset data (0 480 960 1440) indicates an offset amount to be applied when a note pattern represented by the search data is searched through the current pattern, i.e., it is indicative of the location in the current pattern of a note pattern represented by the search data. The error range data (20 20 20 20) indicates an allowance range of the search data. Accordingly, the searched-out note pattern, even if it is not in accurate coincidence with the search data (0 240 360 480), can be suitably replaced with replacement data as long as it falls within the range defined by the search data plus allowance range data (0±20 240±20 360±20 480±20)=(460 to 20 220 to 260 340 to 380 460 to 20).

The replace data (0 160 320) of the replace template indicates a replacing note pattern.

Further, the velocity selection data indicates which of the velocities of the respective notes in the search data is to be used as the velocity of the replace data. More specifically, velocity selection data "0" indicates the velocity of the first data (eighth note) in the search data, velocity selection data "1" indicates the velocity of the second data (first sixteenth note), and velocity selection data "2" indicates the velocity of the third data (second sixteenth note). The data order in the velocity selection data corresponds to that in the replace data.

Namely, in the case where the velocity data is "001", the velocity of the first data (eighth) in the search data is replaced with the first and second data (first and second notes of triplet) in the replace data, and the velocity of the second data (sixteenth note) in the search data is replaced with the third data (third note of triplet).

Further, the drum sound selection data indicates which of the drum sounds of the respective notes in the search data is to be used as the drum sound of the replace data. More specifically, drum sound selection data "0" indicates the drum sound of the first data (eighth note) in the search data, drum sound selection data "1" indicates the drum sound of the second data (first sixteenth note), and drum sound selection data "2" indicates the drum sound of the third data (second triplet note). The data order in the drum selection data corresponds to that in the replace data.

Namely, in the case where the drum sound selection data is "011", the drum sound of the first data (eighth note) in the search data is replaced with that of the first data (first note of triplet) in the replace data, and the drum sound of the second data (sixteenth note) in the search data is replaced with those of the second and third data (second and third notes of triplet) in the replace data.

Pattern A of FIG. 15 shows a current pattern, and this current pattern undergoes the transformer process as shown by patterns B–E in FIG. 15, in accordance with the search template ((0 480 960 1440) (0 240 360 480) (20 20 20 20)) and replace template ((0 160 320) (001) (011)).

First, in the current pattern A of FIG. 15, there are quarter-note-equivalent note patterns which start from the locations indicated by the offset data (0 480 960 1440) and correspond to the search data (0 240 360), and thus any one of the note patterns is replaced in a random fashion. In the illustrated example, the fourth note pattern corresponding to the search data (0 240 360) is replaced with a triplet indicated by the replace data (0 160 320), as shown by pattern B. After that, the second note pattern is replaced with a triplet as shown by pattern C, and then the first note pattern is replaced with a triplet as seen in pattern D. Finally, the third note pattern is replaced a triplet as shown by pattern E. In this way, current pattern A of FIG. 15 is ultimately transformed into a triplet rhythm pattern like pattern E.

Pattern A and pattern B of FIG. 16 are explanatory of a manner in which current pattern A of FIG. 16 is transformed in accordance with the search template ((0 480 960 1440) (0 240 360 480) (20 20 20 20)) and replace template ((0 160 320) (001) (011)).

Current pattern A of FIG. 16 is the same as pattern A of FIG. 15 and has note patterns which start from the locations indicated by the offset data (0 480 960 1440) and correspond to the search data (0 240 360). However, in pattern A of FIG. 16, the offset data of the search template is (0 480 1440) which is devoid of "960" contained in the offset data of FIG. 15. Therefore, in this case, only the third one of the note patterns corresponding to the search data (0 240 360) is maintained in the original form without being replaced with a triplet as indicated by the replace data (0 240 360).

Further, pattern C and pattern D of FIG. 16 are explanatory of a manner in which current pattern C of FIG. 16 is transformed in accordance with the search template ((0 480 960 1440) (0 240 360 480) (20 20 20 20)) and replace template ((0 160 320) (001) (011)).

Unlike pattern A of FIG. 15, current pattern C of FIG. 16 has no note pattern which start from the locations indicated by the offset data and which correspond to the search data (0 240 360), but it has a note pattern which starts from the location indicated by the last offset data (1440). Therefore, in this case, only the fourth one of the note patterns corresponding to the search data (0 240 360) is replaced with a triplet,but the other note patterns are maintained in the original form.

Furthermore, FIG. 17 shows a manner in which the drum sound and velocity of a rhythm pattern are replaced in accordance with the drum sound selection data and velocity selection data.

In patterns A and B of FIG. 17, search template ((0 480 960 1440) (0 240 360 480) (20 20 20 20)) and replace template ((0 160 320) (001) (011)) are the same as those of FIG. 15. Therefore, rhythm pattern A of FIG. 17 is transformed into a triplet rhythm pattern as shown by pattern B of FIG. 17.

Since, in this case, the drum sound selection data is "011", the drum sound of the first data (eighth note) in the search data is replaced with that of the first data (first note of triplet) in the replace data, and the drum sound of the second data (sixteenth note) in the search data is replaced with those of the second and third data (second and third notes of triplet) in the replace data. Such replacements are shown by arrows between patterns A and B.

Similarly, since, in this case, the velocity selection data is "001", the velocity of the first data (eighth note) in the search data is replaced with the first and second data (first and second notes of triplet) in the replace data, and the velocity of the second data (sixteenth note) in the search data is replaced with the third data (third note of triplet). Such replacements are shown by arrows between patterns A and B.

In patterns C and D of FIG. 17, the search template is ((0 480 960 1440) (0 240 360 480) (20 20 20 20)) which is the same as the above-mentioned, but the replace template is ((0 160 320) (001) (***) which is different from the above-mentioned only in drum sound selection data, so that rhythm pattern C of FIG. 17 is replaced with a triplet rhythm pattern like pattern D in a similar manner to the above-described transformer process.

In this case, the drum sound selection data (***) comprises a combination of values "0", "1" and "2" which sequentially varies like (000), (111), (222), (012), . . .

Accordingly, in the first note pattern of rhythm pattern C, the drum sound of the first data (eighth note) in the search data is replaced with the first, second and third data (first, second and third notes of triplet) in the replaced data.

In the second note pattern of rhythm pattern C, the drum sound of the second data (sixteenth note) in the search data is replaced with the first, second and third data (first, second and third notes of triplet) in the replaced data.

In the third note pattern of rhythm pattern C, the drum sound of the third data (sixteenth note) in the search data is replaced with the first, second and third data (first, second and third notes of triplet) in the replaced data.

In the fourth note pattern of rhythm pattern C, the drum sound of the first data (eighth note) in the search data is replaced with the first data (first note of triplet) in the replaced data, the drum sound of the second data (sixteenth note) in the search data is replaced with the second data (second note of triplet) in the replaced data, and the drum sound of the third data (sixteenth note) in the search data is replaced with the third data (third note of triplet) in the replaced data. Such replacements are shown by arrows between patterns C and D.

Figure 18:
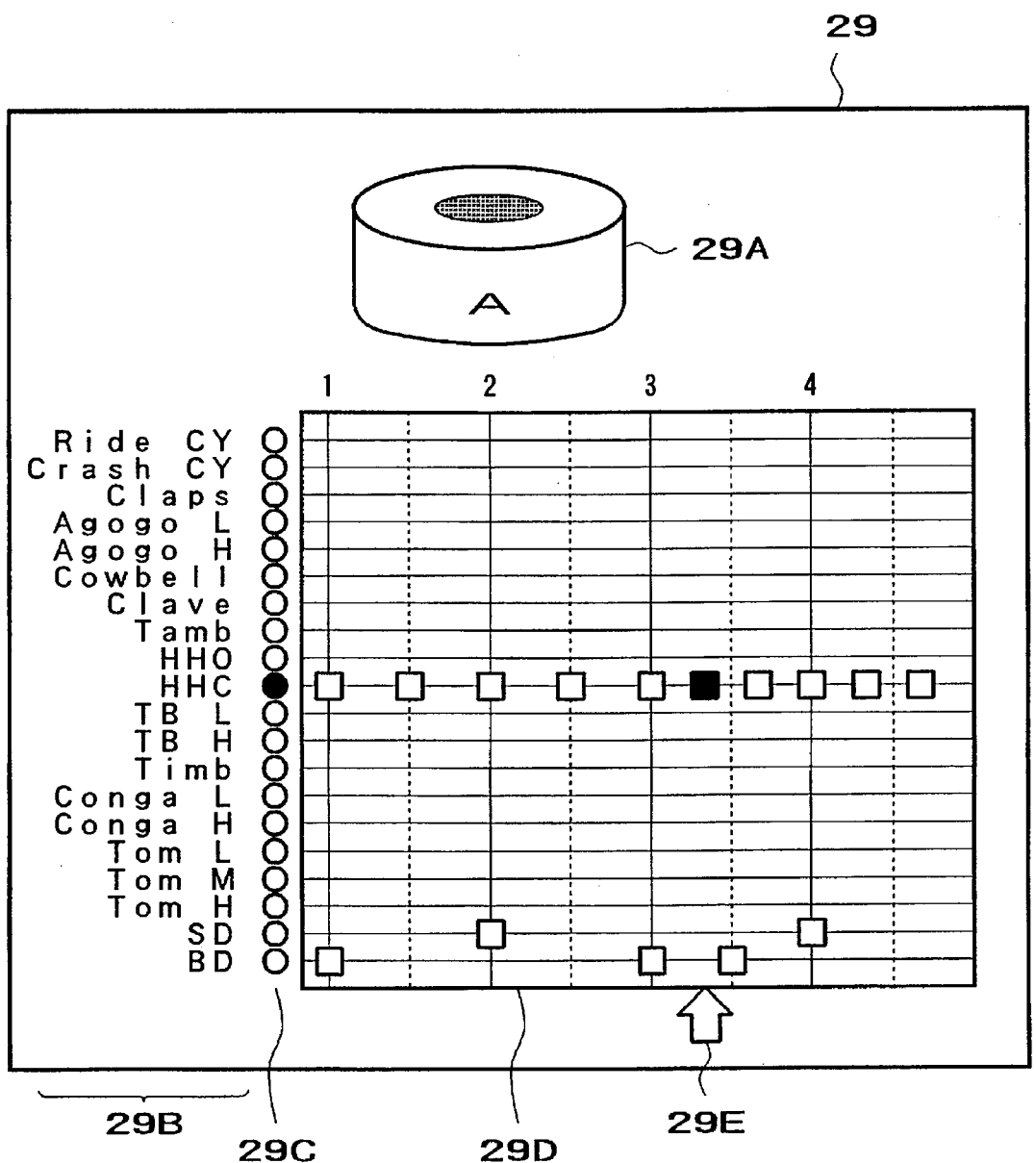
FIG. 18 is a diagram illustrating an example of video data shown on a display of FIG. 2.

FIG. 18 illustrates an example of video data shown on the display 29 of FIG. 2.

A bank display section 29A indicates which of the banks in the hard disk 24 the current bank is. In the illustrated example, the section 29A indicates that the current bank is bank A.

Below the bank display section 29A is a section for indicating the state of the current pattern. This section comprises a drum sound name display section 29B, a current sound display section 29C, a current pattern display section 29D and a current position display section 29E.

The current sound display section 29C comprises a plurality of cylindrical lighting elements which are provided on the right side of the respective drum sound names, in such a manner that only such a lighting element corresponding to a currently-generated drum sound is lit. The current pattern display section 29D shows a rhythm pattern for one measure by a plurality of square lighting elements. In the illustrated example, a rhythm pattern comprising bus drum, snare drum and closed high-hat is shown. The current position display section 29E shows the position in the measure of the currently-generated sound.

By such video data on the display 29, it is possible to immediately recognize the contents of the current pattern. In addition, even when the current pattern has been transformed, it is possible to easily recognize how the pattern has been transformed. To this end, it is only sufficient to simultaneously display the patterns before and after transformation.

The foregoing embodiment has been described as being applied to rhythm accompaniment, but the present invention may also be applied to other forms of accompaniment such as base and chord backing accompaniments, in which case a multiplicity of base patterns and backing patterns are stored in the data base means so that any of the patterns is selected for each performance part in response to actuation of a predetermined operating member. Namely, in this case, operating members are provided in corresponding relation to the base part and backing parts 1, 2, 3, . . . (assuming that tone color is different for each backing part), so that, for example, any of the base patterns is selected from the data base by actuating the operating member for the base part, or any of the backing patterns is selected from the data base by actuating the operating member for backing part 1.

Further, although, in the foregoing embodiment, the second flag-correspondent processing (undo, fill-in, variation and transformer processes) has been described as being initiated when performance to a measure line has been completed, it may be initiated immediately when any of the corresponding keys has been actuated.

In the above description, the accent processing of step 52 in FIG. 13 has been described as providing an accent effect by directly replacing note-on velocity with note number-correspondent velocity. But, an alternative arrangement is possible such that, just like the above-mentioned search template or replace template, plural accent templates each of which, for example, is a pattern indicating the degree of velocity replacement for each timing) are employed so that any of the templates is selected depending on the velocity of note-on note number, and then the velocity of the selected accent template replaces the note-on velocity.

Furthermore, the above-described embodiment employs keyboard keys as keys to which various functions are assigned, but in stead of such keys, switches may be displayed on the display of the personal computer in such a manner that various functions can be designated by selectively designating the switches. Or, the keyboard may be replaced by other suitable operator means such as drum pads or simple switches. Moreover, in the above-described embodiment, all the functions are designated entirely by the keyboard, but these functions may be designated by a combined use of the keyboard and other operating members; for example, the lock function may be assigned to and achieved by foot switch.

Moreover, although the present invention has been described as being applied to an automatic accompaniment device comprising an electronic musical instrument and a personal computer that are interconnected via MIDI circuitry, it is also applicable to an independent electronic musical instrument.

Moreover, although it has been described above that two kinds of modifiers are allotted to each transformer key so that either of the modifiers is selected depending on velocity value, the degree or depth of modifier-dependent transformation may be progressively switched depending on the varying velocity values. Further, only one modifier may be allotted to each transformer key.

Moreover, although, in the above-described embodiment, sequence data for each modifier covers four measures so that it terminates upon completion of performance of the four measures, the sequence data for four measures may be repetitively performed unless termination of the sequence data readout is specifically instructed. Further, of course, the sequence data may cover any other number of measures than four. In addition, the modifier designation may be made at any timings other than a measure line timing.

Furthermore, in changing a rhythm pattern by the transformer, different changing processes may be applied depending on the contents of the rhythm pattern. For instance, in such a case where the change is effected by adding drum sound or replacing a pattern by the transformer, it may be determined what kind of pattern a current rhythm pattern is, and then drum sound to be added or replacing pattern may be varied depending on whether the determined pattern is a 16-beat rhythm pattern or a 8-beat rhythm pattern.

As may be obvious from the foregoing, the present invention can achieve rhythm pattern changes or transformations in a straight forward manner with utmost ease.

What is claimed is:

1. An automatic accompaniment device comprising:

accompaniment pattern storage means for storing a plurality of accompaniment patterns for each of a plurality of accompaniment components;

a plurality of operating members for designating any of said accompaniment components;

touch detection means for, when one of said operating members is operated, detecting an intensity of operation touch applied to said operated operating member;

readout means for reading from said accompaniment pattern storage means one of said plurality of accompaniment patterns corresponding to an accompaniment component designated by said operated operating member on the basis of said intensity of said operation touch applied to said operated operating member as detected by said touch detection means; and accompaniment tone generation means for generating an accompaniment tone on the basis of said accompaniment pattern read by said readout means.

2. An automatic accompaniment device as defined in claim 1 wherein each plurality of accompaniment patterns stored in said accompaniment pattern storage means vary in complexity, and a complexity of an accompaniment pattern read by said readout means corresponds to an intensity of operation touch detected by said touch detection means.

3. An automatic accompaniment device as defined in claim 1 which further comprises modification means for modifying said accompaniment pattern read out by said readout means, and wherein said accompaniment tone generation means generates an automatic accompaniment tone on the basis of said accompaniment pattern modified by said modification means.

4. An automatic accompaniment device as defined in claim 1 which further comprises display means for visibly showing a pattern of said automatic accompaniment tone being generated by said accompaniment tone generation means.

5. An automatic accompaniment device as defined in claim 1 which further comprises display means for visibly showing a pattern of said automatic accompaniment tone being generated by said accompaniment tone generation means.

6. An automatic accompaniment device comprising:
   accompaniment pattern storage means for storing a plurality of accompaniment patterns organized into groups;
   a plurality of operating members for selecting any of said groups;
   touch detection means for, when one of said operating members is operated, detecting an intensity of operation touch applied to said operated operating member;
   readout means for reading from said accompaniment pattern storage means one of said accompaniment patterns in said group selected by said operated operating member on the basis of said intensity of said operation touch applied to said operated operating member as detected by said touch detection means; and
   accompaniment tone generation means for generating an accompaniment tone on the basis of said accompaniment pattern read by said readout means.

7. An automatic accompaniment device as defined in claim 6 wherein each plurality of accompaniment patterns stored in said accompaniment pattern storage means vary in complexity, and a complexity of an accompaniment pattern read by said readout means corresponds to an intensity of operation touch detected by said touch detection means.

8. An automatic accompaniment device as defined in claim 6 which further comprises modification means for modifying said accompaniment pattern read out by said readout means, and wherein said accompaniment tone generation means generates an automatic accompaniment tone on the basis of said accompaniment pattern modified by said modification means.

9. An automatic accompaniment device as defined in claim 6 which further comprises display means for visibly showing a pattern of said automatic accompaniment tone being generated by said accompaniment tone generation means.

10. An automatic accompaniment device as defined in claim 6 wherein each of said groups corresponds to an individual musical instrument for an automatic accompaniment.

11. An automatic accompaniment device comprising:
    accompaniment pattern storage means for storing a plurality of accompaniment patterns for each of a plurality of accompaniment components, each of said accompaniment components comprising at least one musical instrument part;
    a plurality of operating members each for designating a musical instrument part;
    touch detection means for, when one of said operating members is operated, detecting an intensity of operation touch applied to said operated operating member;
    selection means for, when one of said operation members is operated, selecting an accompaniment component comprising said musical instrument part designated by said operated operating member;
    readout means for reading from said accompaniment pattern storage means one of said plurality of accompaniment patterns corresponding to said accompaniment component selected by said selection means on the basis of said intensity of said operation touch applied to said operated operating member as detected by said touch detection means; and
    accompaniment tone generation means for generating an automatic accompaniment tone on the basis of said accompaniment pattern read by said readout means.

12. An automatic accompaniment device as defined in claim 11 which further comprises modification means for modifying said accompaniment pattern read out by said readout means, and wherein said accompaniment tone generation means generates an automatic accompaniment tone on the basis of said accompaniment pattern modified by said modification means.

13. An automatic accompaniment device comprising:
    accompaniment pattern storage means for storing a plurality of accompaniment patterns for each of a plurality of accompaniment components;
    a plurality of operating members for designating any of said accompaniment components;
    touch detection means for, when one of said operating members is operated, detecting an intensity of operation touch applied to said operated operating member;
    selection means for, when one of said operating members is operated, selecting one of said plurality of accompaniment patterns corresponding to an accompaniment component designated by said operated operating member on the basis of said intensity of said operation touch applied to said operated operating member as detected by said touch detection means;
    readout means for reading from said accompaniment pattern storage means said accompaniment pattern selected by said selection means;
    modification means for modifying said accompaniment pattern read by said readout means; and
    accompaniment tone generation means for generating an accompaniment tone on the basis of said accompaniment pattern modified by said modification means.

14. An automatic accompaniment device comprising:
    accompaniment pattern storage means for storing a plurality of accompaniment patterns for each of a plurality of accompaniment components;
    a plurality of operating members for designating any of said accompaniment components;
    touch detection means for, when one of said operating members is operated, detecting an intensity of operation touch applied to said operated operating member;
    selection means for, when one of said operating members is operated, selecting one of said plurality of accompaniment patterns corresponding to an accompaniment component designated by said operated operating member on the basis of said intensity of said operation touch applied to said operated operating member as detected by said touch detection means;
    readout means for reading from said accompaniment pattern storage means said accompaniment pattern selected by said selection means;

accompaniment tone generation means for generating an accompaniment tone on the basis of said accompaniment pattern read out from said readout means; and display means for visibly showing a pattern of said accompaniment tone generated by said accompaniment tone generation means.

15. An automatic accompaniment device comprising:

accompaniment pattern storage means for storing a plurality of accompaniment patterns for each of a plurality of accompaniment components;

a plurality of operating members for designating any of said accompaniment components;

touch detection means for, when one of said operating members is operated, detecting an intensity of operation touch applied to said operated operating member;

selection means for, when one of said operating members is operated, selecting one of said plurality of accompaniment patterns corresponding to said accompaniment component designated by said operated operating member on the basis of said intensity of said operation touch applied to said operated operating member as detected by said touch detection means;

readout means for reading from said accompaniment pattern storage means said accompaniment pattern selected by said selection means; and first control means for allowing an accompaniment tone to be generated on the basis of said accompaniment pattern read from said accompaniment pattern storage means only while said operated operating member continues to be operated.

16. An automatic accompaniment device as defined in claim 15 which further comprises second control means for allowing an accompaniment tone to be generated on the basis of said accompaniment pattern read out from said accompaniment pattern storage means even after said operated operating member is no longer operated.

17. An automatic accompaniment device as defined in claim 15 which further comprises:

reservation means for, when an accompaniment pattern is selected by said selection means, storing information identifying an accompaniment pattern previously selected for said accompaniment component designated by said operated operating member; and second control means for, after said operating member is no longer being operated, allowing generation of an accompaniment tone on the basis of said accompaniment pattern identified by said information stored by said reservation means.

18. An automatic accompaniment device as defined in claim 15 which further comprises mode selection means for selecting a lock mode, wherein while said lock mode is selected, said automatic accompaniment tone continues to be generated based on said accompaniment pattern read from said accompaniment pattern storage means even after said operated operating member is no longer being operated.

19. An automatic accompaniment device comprising:

accompaniment pattern storage means for storing accompaniment patterns;

readout means for reading an accompaniment pattern from said accompaniment pattern storage means;

a plurality of operating members;

touch detection means for, when one of said operating members is operated, detecting an intensity of operation touch applied to said operated operating member;

selection means for, when one of said operating members is operated, selecting at least one modifier on the basis of said operated operating member and said intensity of operation touch applied to said operated operating member; and change means for changing said accompaniment pattern read by said readout means in accordance with said at least one modifier selected by said selection means.

20. An automatic accompaniment device as defined in claim 19 in which said change means further changes said accompaniment pattern read by said readout means in accordance with a predetermined at least one of a plurality of change parameters.

21. An automatic accompaniment device as defined in claim 19 in which said change means is capable of changing said accompaniment pattern in accordance with a combination of plural modifier data.

22. An automatic accompaniment device as defined in claim 19, wherein said selection means further comprises means for selecting said at least one modifier from among a plurality of modifier groups, each of said modifier groups comprising a plurality of related modifiers.

23. An automatic accompaniment device as defined in claim 19, wherein said selection means selects two modifiers on the basis of said operated operating means and further selects one of said two selected modifiers on the basis of said intensity of operation touch applied to said operated operating means.

24. An automatic accompaniment device as defined in claim 19 further comprising changed pattern storage means for storing said accompaniment pattern changed by said change means.

25. An automatic accompaniment device as defined in claim 24 further comprising undo readout means for retrieving said accompaniment patterns stored in said changed pattern storage means in an order in which said stored patterns were changed by said change means.

26. An automatic accompaniment device as defined in claim 19 further comprising modifier supply means for supplying modifier data corresponding to at least one of said modifiers selected by said selection means, wherein said change means utilizes said supplied modifier data to change said accompaniment pattern read by said readout means.

27. An automatic accompaniment device as defined in claim 26 in which said modifier supply means supplies a plurality of modifier data in a predetermined sequence during a given time period.

28. An automatic accompaniment device as defined in claim 19, wherein said selection means selects said at least one modifier on said additional basis of a type of said accompaniment pattern read by said readout means.

29. An automatic accompaniment device comprising:

accompaniment pattern supply means for supplying an accompaniment pattern;

search template designation means for designating a search template comprising a first partial pattern;

replace template designation means for designating a replace template comprising a second partial pattern;

search means for searching said accompaniment pattern supplied by said supply means for a partial pattern that corresponds to said first partial pattern composing said search template designated by said search template designation means; and pattern change means for replacing a partial pattern found by said search means with said second partial pattern composing said replace template designated by said replace template designation means, thereby changing said accompaniment pattern supplied by said supply means.

30. An automatic accompaniment device as defined in claim 29, wherein said search means determines that a partial pattern in said accompaniment pattern supplied by said accompaniment pattern supply means corresponds to said first partial pattern if said partial pattern in said accompaniment pattern and said first partial pattern match within a predetermined tolerance.

31. An automatic accompaniment device as defined in claim 29, wherein said search template further comprises position data indicating a position of said first partial pattern.

32. An automatic accompaniment device comprising:

accompaniment pattern storage means for storing a plurality of accompaniment patterns and a plurality of accompaniment components;

a plurality of operating members for designating any of said accompaniment components;

touch detection means for, when any of said operating members is operated, detecting an intensity of operation touch applied to said operated operating member;

readout means for reading from said accompaniment pattern storage means one of said plurality of accompaniment patterns corresponding to said accompaniment component designated by said operated operating member on the basis of a combination of information identifying said operated operating member and information indicative of said intensity of operation touch detected by said touch detection means; and accompaniment tone generation means for generating an accompaniment tone on the basis of said accompaniment pattern read by said readout means.

* * * * *